US012580214B2

(12) United States Patent
Bartels et al.

(10) Patent No.: US 12,580,214 B2
(45) Date of Patent: Mar. 17, 2026

(54) ELECTROCHEMICAL MEMBRANE

(71) Applicant: W. L. Gore & Associates, Inc., Newark, DE (US)

(72) Inventors: Joshua Bartels, Flagstaff, AZ (US); Navya Jagarlamudi, Flagstaff, AZ (US)

(73) Assignee: W. L. Gore & Associates, Inc.

( * ) Notice: Subject to any disclaimer, the term of this patent is extended or adjusted under 35 U.S.C. 154(b) by 349 days.

(21) Appl. No.: 18/021,988

(22) PCT Filed: Aug. 18, 2021

(86) PCT No.: PCT/IB2021/057600
§ 371 (c)(1),
(2) Date: Feb. 17, 2023

(87) PCT Pub. No.: WO2022/038540
PCT Pub. Date: Feb. 24, 2022

(65) Prior Publication Data
US 2023/0369621 A1 Nov. 16, 2023

Related U.S. Application Data

(60) Provisional application No. 63/067,665, filed on Aug. 19, 2020.

(51) Int. Cl.
*H01M 8/1004* (2016.01)
*B01D 69/12* (2006.01)
(Continued)

(52) U.S. Cl.
CPC ...... *H01M 8/1004* (2013.01); *B01D 69/1216* (2022.08); *C25B 11/055* (2021.01); (Continued)

(58) Field of Classification Search
CPC ....... C25B 1/04; C25B 11/055; C25B 11/089; C25B 13/02; C25B 13/08; C25B 9/23; (Continued)

(56) References Cited

U.S. PATENT DOCUMENTS

| | | | |
|---|---|---|---|
| 2014/0377687 | A1 | 12/2014 | Miyake et al. |
| 2016/0186334 | A1 | 6/2016 | Murahara |

(Continued)

FOREIGN PATENT DOCUMENTS

| | | | |
|---|---|---|---|
| EP | 2190047 | A1 | 5/2010 |
| JP | 2013-168365 | A | 8/2013 |

(Continued)

OTHER PUBLICATIONS

International Search Report and Written Opinion received for PCT Patent Application No. PCT/IB2021/057600, mailed on Nov. 16, 2021, 12 pages.

*Primary Examiner* — Victoria H Lynch
(74) *Attorney, Agent, or Firm* — Faegre Drinker Biddle & Reath

(57) ABSTRACT

This disclosure relates to polymer electrolyte membranes, and in particular, to a composite membrane having at least two reinforcing layers comprising a microporous polymer structure and a surprisingly high resistance to piercing. This disclosure also relates to composite membrane-assemblies and electrochemical devices comprising the composite membranes of the disclosure, and to methods of manufacture of the composite membranes.

30 Claims, 9 Drawing Sheets

(51) Int. Cl.

| | |
|---|---|
| ***C25B 11/055*** | (2021.01) |
| ***C25B 11/089*** | (2021.01) |
| ***H01M 4/86*** | (2006.01) |
| ***H01M 4/88*** | (2006.01) |
| ***H01M 4/92*** | (2006.01) |
| ***H01M 4/96*** | (2006.01) |
| ***H01M 8/1039*** | (2016.01) |
| ***H01M 8/1048*** | (2016.01) |
| ***H01M 8/1067*** | (2016.01) |
| ***H01M 8/18*** | (2006.01) |

(52) U.S. Cl.
CPC ......... *C25B 11/089* (2021.01); *H01M 4/8605* (2013.01); *H01M 4/8892* (2013.01); *H01M 4/926* (2013.01); *H01M 4/96* (2013.01); *H01M 8/1039* (2013.01); *H01M 8/1048* (2013.01); *H01M 8/1067* (2013.01); *H01M 8/188* (2013.01); *H01M 2300/0082* (2013.01)

(58) Field of Classification Search
CPC ............ B01D 2325/04; B01D 2325/42; B01D 69/02; B01D 69/1216; B01D 71/36; H01M 2300/0082; H01M 4/8605; H01M 4/8673; H01M 4/8892; H01M 4/9041; H01M 4/926; H01M 4/96; H01M 8/1004; H01M 8/1039; H01M 8/1048; H01M 8/1053; H01M 8/106; H01M 8/1067; H01M 8/1081; H01M 8/188; Y02E 60/36; Y02E 60/50; Y02P 70/50
See application file for complete search history.

(56) References Cited

U.S. PATENT DOCUMENTS

| | | | | |
|---|---|---|---|---|
| 2018/0102549 | A1 | 4/2018 | Yordem et al. | |
| 2018/0294460 | A1 | 10/2018 | Roumi | |
| 2018/0301713 | A1 * | 10/2018 | Bardy .................. | D03D 13/008 |
| 2019/0067725 | A1 | 2/2019 | Wainright et al. | |
| 2019/0097241 | A1 | 3/2019 | Weber et al. | |
| 2019/0217252 | A1 | 7/2019 | Newbloom et al. | |

FOREIGN PATENT DOCUMENTS

| | | | |
|---|---|---|---|
| WO | 2017/218781 | A1 | 12/2017 |
| WO | 2018/111635 | A1 | 6/2018 |
| WO | 2018/111968 | A1 | 6/2018 |
| WO | 2018/229235 | A1 | 12/2018 |
| WO | 2018/231232 | A1 | 12/2018 |
| WO | 2018/232254 | A1 | 12/2018 |
| WO | 2019/079047 | A1 | 4/2019 |
| WO | 2020/023057 | A1 | 1/2020 |

* cited by examiner

| Sample name | Reinforcement Layer Type (see Table 2) | No. ePTFE layers | ePTFE Separation (µm) | Total PEM thickness (µm) @50%RH | Total PEM thickness (µm) @0%RH | Ionomer EW (g/eq $SO_3^-$) | Total mass of microporous polymer structure per area (g/m2) | Normalized content of microporous polymer structure(µm) | Avg Failure Pressure (psi) |
|---|---|---|---|---|---|---|---|---|---|
| Prior art example 1 | 1 | 2 | 1 | 9 | 8.66 | 810 | 5.6 | 2.4 | 73.8 |
| Comparative Example 1.1 | 2 | 1 | NA | 9 | 8.61 | 810 | 6 | 2.7 | 77.1 |
| Comparative Example 1.2 | 3 | 1 | NA | 8 | 7.77 | 710 | 3.9 | 1.7 | 94.7 |
| Prior art example 2 | 4+6 | 2 | 0 | 7.5 | 7.07 | 810 | 6.1 | 2.7 | 138.3 |
| Comparative Example 2.1 | 5 | 1 | NA | 9 | 8.76 | 810 | 4.5 | 2 | 125.0 |
| Comparative Example 3.1 | 7 | 1 | NA | 16 | 15.25 | 710 | 10.4 | 4.6 | 134.1 |
| Inventive Example 3.2 | 3 | 2 | 2 | 15 | 14.47 | 710 | 7.8 | 3.6 | 345.0 |
| Inventive Example 3.3 | 5 | 2 | 2 | 15 | 14.38 | 710 | 9 | 4 | 204.5 |

FIG. 11– TABLE 1

| Sample name | Reinforcement Layer Type (see Table 2) | No. ePTFE layers | ePTFE Separation (μm) | Total PEM thickness (μm) @50%RH | Total PEM thickness (μm) @0%RH | Ionomer EW (g/eq $SO_3^-$) | Total mass of microporous polymer structure per area (g/m2) | Normalized content of microporous polymer structure(μm) | Avg Failure Pressure (psi) |
|---|---|---|---|---|---|---|---|---|---|
| Comparative Example 4.1 | 7 | 1 | NA | 16 | 15.25 | 710 | 10.4 | 4.6 | 134.1 |
| Inventive Example 4.2 | 5 | 2 | 0 | 15 | 14.38 | 710 | 9 | 4 | 179.3 |
| Inventive Example 4.3 | 5 | 2 | 2 | 15 | 14.38 | 710 | 9 | 4 | 187.3 |
| Inventive Example 4.4 | 5 | 2 | 4 | 15 | 14.38 | 710 | 9 | 4 | 190.0 |
| Comparative Example 5.1 | 8 | 1 | NA | 25 | 23.78 | 810 | 18 | 8 | 88.0 |
| Inventive Example 5.2 | 5+7 | 2 | 0 | 25 | 24.08 | 810 | 14.9 | 6.7 | 295.9 |
| Inventive Example 5.3 | 5 | 3 | 0 | 25 | 24.23 | 810 | 13.5 | 6 | 314.3 |
| Inventive Example 5.4 | 9 | 2 | 0 | 25 | 23.98 | 810 | 19.8 | 8.8 | >412.8 |
| Comparative Example 6.1 | 10 | 1 | NA | 41 | 38.77 | 1100 | 29.5 | 13.1 | >366.2 |
| Inventive Example 6.2 | 7 | 3 | 1 | 41 | 38.61 | 1100 | 31.2 | 13.8 | >419 |

FIG 11 CONTINUED – TABLE 1

| Material | Reinforcement Layer Type | Mass per area ($g/m^2$) | Noncontact thickness (um) | Bubble point (psi) | Ball Burst, 0.25in diameter (lbf) | Density |
|---|---|---|---|---|---|---|
| ePTFE | 1 | 2.8 | 9.6 | 34.4 | NA | 0.29 |
| ePTFE | 2 | 6 | 19.7 | 34.8 | 4.1 | 0.33 |
| ePTFE | 3 | 3.9 | 11.7 | 97.5 | 4.43 | 0.34 |
| ePTFE | 4 | 3.1 | 13.3 | 55.5 | 3.57 | 0.33 |
| ePTFE | 5 | 4.5 | 23 | 55.8 | 3 | 0.2 |
| ePTFE | 6 | 3 | 15.2 | 36.6 | NA | 0.2 |
| ePTFE | 7 | 10.4 | 62.2 | 56.2 | 5.8 | 0.16 |
| ePTFE | 8 | 18 | 33.4 | 23.7 | 3.33 | 0.53 |
| ePTFE | 9 | 9.9 | 23 | >130 | NA | 0.43 |
| ePTFE | 10 | 29.5 | 137 | 43.5 | 8.9 | 0.22 |

FIG. 12– TABLE 2

ELECTROCHEMICAL MEMBRANE

CROSS-REFERENCE TO RELATED APPLICATION

This application is a national phase application of PCT Application No. PCT/IB2021/057600, internationally filed on Aug. 18, 2021, which claims the benefit of U.S. Provisional No. 63/067,665, filed Aug. 19, 2020, which are herein incorporated by reference in their entireties for all purposes.

FIELD

This disclosure relates to polymer electrolyte membranes, and in particular, to a composite membrane having at least two reinforcing layers comprising a microporous polymer structure and surprisingly high resistance to piercing.

BACKGROUND

Polymer Electrolyte Membranes (PEMs) are critical components in many applications, such as fuel cells, electrolyzers, redox flow batteries.

In Fuel Cells, the Polymer Electrolyte Membrane (PEM) is part of a Membrane Electrode Assembly (MEA). The MEA is the core component of the fuel cell where the electrochemical reactions take place that generate power. A typical MEA comprises a PEM, two catalyst layers (i.e., the anode and the cathode, which are attached to opposite sides of the PEM), and two gas diffusion layers (GDLs) which are attached to the two outer surfaces of the catalyst layers. The PEM separates two reactant gas streams. On the anode side of the MEA, a fuel, e.g., hydrogen gas, is oxidized to separate the electrons and protons. The cell is designed so that the electrons travel through an external circuit while the protons migrate through the PEM. On the cathode side the electrons and protons react with an oxidizing agent (i.e., oxygen or air) to produce water and heat. In this manner, an electrochemical potential is maintained and current can be drawn from the fuel cell to perform useful work.

Redox flow batteries use two soluble redox couples as electroactive materials to store energy via oxidation and reduction reactions. Typically, the redox flow batteries comprise two electrolyte reservoirs (cathiolyte and aniolyte) from which the electrolytes are circulated by pumps through an electrochemical cell stack. The cell stack usually comprises multiple cells connected in series or parallel to enable the electrochemical reaction to take place at inert electrodes. Each cell of the stack comprises an anode, a cathode and an ion exchange membrane separator (e.g. a polymer electrolyte membrane PEM) to allow diffusion of ions across the membrane separator while preventing the cross-mixing of the electrolyte solutions from the two reservoirs.

Electrolyzers hydrolyze water to generate hydrogen and oxygen. The reactions that take place in an electrolyzer are very similar to the reaction in fuel cells, except the reactions that occur in the anode and cathode are reversed. In a fuel cell the anode is where hydrogen gas is consumed and in an electrolyzer the hydrogen gas is produced at the cathode. Bipolar electrolyzers (or PEM electrolyzers) use the same type of electrolyte separator as PEM fuel cells. The electrolyte separator is a thin, solid ion-conducting membrane, which is used instead of the thick, porous membrane separating aqueous solution employed in alkaline electrolyzers.

High selectivity (via high conductance and/or low permeance), high durability, and low cost, are all desirable qualities in a PEM. However, as a matter of practical engineering, conflicts often arise in the optimization of these properties, requiring tradeoffs to be accepted. One can attempt to improve selectivity by increasing conductance via reduction in membrane thickness. Making a PEM thinner also lowers its cost because ionomer is expensive and less of it is used. However, thinner membranes have increased hydrogen permeation, which erodes any selectivity gains from increased proton conduction, and results in thinner membranes having similar or worse selectivity than thicker ones. In addition, thinner membranes also are weaker, frequently lacking sufficient mechanical durability for aggressive automotive conditions. Reducing the membranes physical thickness can also increase the susceptibility to damage or puncture from other electrochemical device components, leading to shorter cell lifetimes.

Piercing of PEMs can be particularly problematic in Redox Flow Batteries (RFB), which employ electrode layers disposed at either side of the PEM. RFB electrode layers usually comprise a porous layer (typical pore size 1-200 micron). The porous layer may comprise, among others, a felt, a paper, or a woven material. RFB electrodes usually comprise carbon fibers which, upon compression of the electrode layer against the PEM during PEM-electrode assembly, can pierce the PEM. Therefore, access to membranes with higher proton conductance is restricted by membrane piercing resistance requirements.

Ultimately, PEM electrochemical devices can fail because of pinholes that develop and propagate through the polymer electrolyte membranes. In addition, these devices can also fail if electronic current passes through the PEMs, causing the systems to short.

A state of the art approach to improving the mechanical resistance and resistance to piercing properties of PEMs involves reinforcing the polymer electrolyte membrane with a continuous layer of microporous polymer structure. This layer of microporous polymer structure is completely imbibed with a polymer electrolyte (e.g. an ionomer) and it is therefore fully conductive to ions. However, even reinforced PEMs can be subject to piercing upon assembly of the PEM during electrochemical device fabrication.

Accordingly, the need exists for thin composite membranes that retain high performance and low ionic resistance while presenting higher resistance to piercing by the electrochemical device components and subsequent shorting than state of the art composite membranes.

SUMMARY

The inventors have endeavored to solve the problems mentioned above. The inventors have surprisingly discovered that, for a given total content of microporous polymer structure and thickness of the composite membrane at 0% RH, distributing the microporous polymer structure in at least two (or more) reinforcing layers further increases the resistance to piercing of the membrane by components of electrochemical devices upon device fabrication. The inventors have also discovered that the average failure pressure of a composite electrolyte membranes is further improved when the total content of microporous polymer structure in the composite electrolyte membranes (distributed between the at least two the reinforcing layers) is increased. These discoveries are highly beneficial, because, compared with state of the art composite electrolyte membranes, the composite membranes described herein present superior resistance to piercing by components of the electrochemical devices in which the composite membrane can be integrated. The inventors have also surprisingly discovered that separating the at least two reinforcing layers by a distance d further increases the resistance to piercing of the composite membrane by components of electrochemical devices upon device fabrication. Therefore, the composite membranes described herein have superior resistance to piercing by elements of electrochemical devices upon device fabrication, without compromising the performance of the membranes.

In an aspect there is provided a composite membrane for an electrochemical device, comprising:

a) at least two reinforcing layers, each of said at least two reinforcing layers comprising a microporous polymer structure; and b) an ion exchange material (IEM) at least partially imbibed within the microporous polymer structure of the at least two reinforcing layers and rendering the microporous polymer structure occlusive; wherein the composite membrane has a thickness at 0% RH of at least 10 μm.

Within the context of this disclosure, the term composite membrane comprises a Polymer Electrolyte Membrane (PEM) as well as composite electrolyte membrane.

The microporous polymer structure is present in the composite membrane in a total content (or amount) of at least about 20 vol % based on the total volume of the composite membrane. Within the context of this disclosure, the total content of microporous polymer structure in a composite membrane is the total content (mass or volume) of microporous polymer structure present in the composite membrane (distributed among at least two reinforcing layers). Within the context of this disclosure, the total content of microporous polymer structure in a composite membrane may also be expressed as reinforcing microporous polymer structure content in the composite membrane.

The composite membrane may comprise two reinforcing layers. The composite membrane may comprise three reinforcing layers. The composite membrane may comprise four reinforcing layers. The composite membrane may comprise five reinforcing layers. The composite membrane may comprise from two to 10 reinforcing layers. The composite membrane may comprise any suitable number of reinforcing layers.

The composite membrane may have a thickness at 0% relative humidity (RH) of at least about 10 μm. The composite membrane may have a thickness at 0% relative humidity (RH) from about 10 μm to about 115 μm, or from about 10 μm to about 100 μm, or from about 10 μm to about 90 μm, or from about 10 μm to about 80 μm, or from about 10 μm to about 75 μm, or from about 10 μm to about 70 μm, or from about 10 μm to about 60 μm, or from about 10 μm to about 50 μm, or from about 10 μm to about 40 μm, or from about 10 μm to about 30 μm, or from about 10 μm to about 20 μm, or from about 10 μm to about 15 μm, or from about 10 μm to about 12 μm, or from about 20 μm to about 60 μm, or from about 30 μm to about 60 μm, or from about 40 μm to about 60 μm, or from about 12 μm to about 30 μm, or from about 12 μm to about 20 μm, or from about 15 μm to about 30 μm, or from about 15 μm to about 20 μm, or from about 20 μm to about 30 μm. The composite membrane may have a thickness at 0% RH of about 10 μm, or about 11 μm, or about 12, or about 13 μm, or about 14 μm, or about 15 μm, or about 16 μm, or about 17 μm, or about 18 μm, or about 19 μm, or about 20 μm, or about 21 μm, or about 22 μm, or about 23 μm, or about 24 μm, or about 25 μm, or about 30 μm, or about 35 μm, or about 40 μm, or about 45 μm, or about 50 μm, or about 55 μm, or about 60 μm, or about 65 μm, or about 70 μm, or about 75 μm, or about 80 μm, or about 85 μm, or about 90 μm, or about 95 μm, or about 100 μm, or about 105 μm, or about 110 μm, or about 115 μm.

Within the context of this disclosure, the total content of the microporous polymer structure within the composite membrane may be presented in terms of total mass per area of the microporous polymer structure in the composite membrane (distributed among at least two reinforcing layers) ($g/m^2$). The composite membrane may comprise one or more types of microporous polymer structures. For example, the composite membrane may comprise a single type of microporous polymer structure (e.g. ePTFE) present in at least two reinforcing layers. The composite membrane may comprise at least two reinforcing layers, and each reinforcing layer may comprise a mixture of different types of microporous polymer structures (e.g. fluorinated polymers and hydrocarbon polymers). The composite membrane may comprise at least two reinforcing layers and a first of the at least two reinforcing layers may comprise a single type of microporous polymer structure (e.g. ePTFE) and a second of the at least two reinforcing layers may comprise a single type of microporous polymer structure different from the microporous polymer structure of the first of the at least two reinforcing layers (e.g. hydrocarbon polymer). The total content of the microporous polymer structure within the composite membrane expressed in mass per area (i.e. the sum of the mass of microporous polymer structure present in each of the reinforcing layers of the composite membrane divided by the area of the composite membrane) may be normalized using the following formula:

$$\text{Total content (mass per area) of microporous polymer structure in composite membrane} = \sum \frac{M_{mps}\text{in each reinforcing layer}/A_{composite\ membrane}(g\cdot m^{-2})}{A_{composite\ membrane}} \cdot 10^{-6}\frac{m^3}{cm^3}$$

Wherein $M_{mps}$ stands for mass of microporous polymer structure (g), $A_{composite\ membrane}$ is the total area of the composite membrane ($m^2$), matrix skeletal density$_{mps}$ stands for matrix skeletal density of the microporous polymer structure ($g/cm^3$).

Matrix skeletal density is the mass of the solid divided by the volume of the solid excluding open and closed pores. Matrix skeletal density represents the density of the solid portion of the material and therefore has units of grams of solid per $cm^3$ of solid. Matrix skeletal density is typically evaluated by helium pycnometry experiments and represents the true solid density of a material when there is no closed porosity. For a non-porous solid, the matrix skeletal density is the same as the geometric or envelope density. Within the context of this disclosure, the matrix skeletal density of ePTFE may be taken to be about 2.25 $g/cm^3$. The matrix skeletal density of track etched porous polycarbonate may be taken to be about 1.20 $g/cm^3$.

In embodiments in which the composite membrane comprises more than one type of microporous polymer structure, the normalized total content (in mass per area) of microporous polymer structure within the composite membrane can be calculated with the following formula:

Normalized total content of microporous polymer structure =

$$\left[\sum \frac{M_{mps1} \text{ in each reinforcing layer}/A_{composite\ membrane}(\text{g}\cdot\text{m}^{-2})}{\text{matrix skeletal density}_{mps1}(g\cdot\text{cm}^{-3})} + \sum \frac{M_{mps2} \text{ in each reinforcing layer}/A_{\text{composite membrane}}(\text{g}\cdot\text{m}^{-2})}{\text{matrix skeletal density}_{\text{mps2}}(\text{g}\cdot\text{cm}^{-3})} + \ldots + \sum \frac{M_{mpsN} \text{ in each reinforcing layer}/A_{composite\ membrane}(\text{g}\cdot\text{m}^{-2})}{\text{matrix skeletal density}_{mpsN}(\text{g}\cdot\text{cm}^{-3})}\right]\cdot 10^{-6}\frac{\text{m}^3}{\text{cm}^3}$$

Wherein mps1 is microporous polymer structure 1 (e.g. ePTFE), mps2 is microporous polymer structure 2 (e.g. polycarbonate), mpsN is microporous polymer structure N (if there are N different types of microporous polymer structures within the composite membrane).

The normalized total content of the microporous polymer structure within the composite membrane may be at least about $2.4\cdot10^{-6}$ m (i.e. 2.4 μm), or about 3 μm, or about 3.5 μm, or about 4 μm, or about 4.5 μm, or about 5 μm, or about 5.5 μm, or about 6 μm, or about 6.5 μm, or about 7 μm, or about 8 μm, or about 8.5 μm, or about 9 μm based on the total area of the composite membrane.

As discussed above, the total content of microporous polymer structure in the composite membrane may be expressed in terms of the volume percentage occupied by the microporous polymer structure (distributed among at least two reinforcing layers) in the composite membrane. The microporous polymer structure may be present in a total content of at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 55 vol %, or at least about 60 vol %, or at least about 65 vol %, or at least about 70 vol %, based on the total volume of the composite membrane.

The microporous polymer structure may be present in a total content from about 15 vol % to about 70%, or from about 20 vol % to about 70%, or from about 30 vol % to about 70%, or from about 40 vol % to about 70%, or from about 50 vol % to about 70%, or from about 60 vol % to about 70%, or from about 65 vol % to about 70%, or from about 15 vol % to about 65%, or from about 20 vol % to about 65%, or from about 30 vol % to about 65%, or from about 40 vol % to about 65%, or from about 50 vol % to about 65%, or from about 60 vol % to about 65%, or from about 20 vol % to about 60%, or from about 20 vol % to about 50%, or from about 20 vol % to about 40%, or from about 20 vol % to about 30%, or from about 40 vol % to about 60%, or from about 40 vol % to about 50%, based on the total volume of the composite membrane. The microporous polymer structure may be present in a total content of about 20 vol %, or about 25 vol %, or about 30 vol %, or about 35 vol %, or about 40 vol %, or about 45 vol %, or about 50 vol %, or about 55 vol %, or about 60 vol %, or about 65 vol %, based on the total volume of the composite membrane.

A composition of the at least two reinforcing layers may be the same. Alternatively, a composition of the at least two reinforcing layers may be different.

The microporous polymer structure may comprise a fluorinated polymer. The microporous polymer structure may comprise one or more fluorinated polymers selected from the group comprising: polytetrafluoroethylene (PTFE), poly (ethylene-co-tetrafluoroethylene) (EPTFE), expanded polytetrafluoroethylene (ePTFE), polyvinylidene fluoride (PVDF), expanded polyvinylidene fluoride (ePVDF), expanded poly(ethylene-co-tetrafluoroethylene) (eEPTFE) or mixtures thereof. Preferably, the fluorinated polymer may be perfluorinated expanded polytetrafluoroethylene (ePTFE).

The microporous polymer structure may comprise a hydrocarbon polymer. The hydrocarbon polymer may comprise polyethylene, polypropylene, polycarbonate, track etched polycarbonate, polystyrene, or mixtures thereof.

In embodiments in which the microporous polymer structure comprises ePTFE, the total mass per area of the microporous polymer structure may be at least about 5.5 g/m$^2$, or at least about 6 g/m$^2$, or at least about 7 g/m$^2$, or at least about 8 g/m$^2$, or at least about 9 g/m$^2$, or at least about 10 g/m$^2$, or at least about 11 g/m$^2$, or at least about 12 g/m$^2$, or at least about 14 g/m$^2$, or at least about 16 g/m$^2$, based on the total area of the composite membrane.

In embodiments in which the microporous polymer structure comprises ePTFE, the total mass per area of the microporous polymer structure may be from about 5.5 g/m$^2$ to about 80 g/m$^2$, or from about 5.5 g/m$^2$ to about 70 g/m$^2$, or from about 5.5 g/m$^2$ to about 60 g/m$^2$, or from about 5.5 g/m$^2$ to about 60 g/m$^2$, or from about 5.5 g/m$^2$ to about 50 g/m$^2$, or from about or from about 5.5 g/m$^2$ to about 40 g/m$^2$, or from about 5.5 g/m$^2$ to about 35 g/m$^2$, or from about 5.5 g/m$^2$ to about 30 g/m$^2$, or from about 5.5 g/m$^2$ to about 20 g/m$^2$, or from about 5.5 g/m$^2$ to about 15 g/m$^2$ based on the total area of the composite membrane.

When the composite membrane is for redox flow battery applications, the total mass per area of the microporous polymer structure may preferably be from about 5.5 g/m$^2$ to about 35 g/m$^2$, or from about 5.5 g/m$^2$ to about 16 g/m$^2$, or from about 5.5 g/m$^2$ to about 14 g/m$^2$, or from about 5.5 g/m$^2$ to about 12 g/m$^2$, or from about 5.5 g/m$^2$ to about 10 g/m$^2$, or from about 9 g/m$^2$ to about 20 g/m$^2$, or from about 9 g/m$^2$ to about 15 g/m$^2$, or from about 10 g/m$^2$ to about 18 g/m$^2$, or from about 8 g/m$^2$ to about 15 g/m$^2$, based on the sum of the mass per area of all microporous layers present in the composite membrane.

When the composite membrane is for electrolyzer applications, the microporous polymer structure content may be higher than for redox flow battery applications. For example, when the composite membrane is for electrolyzer applications, total mass per area of the microporous polymer structure may be from about 20 g/m$^2$ to about 80 g/m$^2$, or from about 30 g/m$^2$ to about 70 g/m$^2$, or from about 20 g/m$^2$ to about 50 g/m$^2$, or from about 30 g/m$^2$ to about 60 g/m$^2$, based on the sum of the mass per area of all microporous layers present in the composite membrane.

In embodiments in which the microporous polymer structure comprises ePTFE, the total mass per area of the microporous polymer structure may be about 5.5 g/m$^2$, or about 6 g/m$^2$, or about 7 g/m$^2$, or about 8 g/m$^2$, or about 9 g/m$^2$, or about 10 g/m$^2$, or about 11 g/m$^2$, or about 12 g/m$^2$, or about 13 g/m$^2$, or about 14 g/m$^2$, or about 15 g/m$^2$, or about 16 g/m$^2$, or about 17 g/m$^2$, or about 18 g/m$^2$, or about 19 g/m$^2$, or about 20 g/m$^2$, based on the sum of the mass per area of all microporous layers present in the composite membrane.

In embodiments in which the microporous polymer structure comprises a hydrocarbon polymer, total mass per area of the microporous polymer structure may be at least about 3.5 g/m$^2$, or at least about 4 g/m$^2$, or at least about 4.5 g/m$^2$, or at least about 5 g/m$^2$, or at least about 5.5 g/m$^2$, or at least about 6 g/m$^2$, or at least about 7 g/m$^2$, or at least about 8 g/m$^2$, based on the total area of the composite membrane.

The composite membrane may have an average failure pressure of at least about 150 psi, or at least about 160 psi, or at least about 170 psi, or at least about 180 psi, or at least about 190 psi, at least about 200 psi, when measured by the Average Puncture Pressure Failure Test Average Puncture Pressure Failure Test described hereinbelow.

The composite membrane may have an average failure pressure of from about 150 psi to about 2000 psi, or from about 150 psi to about 1500 psi, or from about 150 psi to about 1000 psi, or from about 150 psi to about 500 psi, or from about 150 psi to about 300 psi, or from about 200 psi to about 400 psi, or from about 200 psi to about 400 psi, when measured by the Average Puncture Pressure Failure Test described hereinbelow.

The composite membrane may have an average failure pressure of from about 150 psi, or about 200 psi, or about 250 psi, or about 300 psi, or about 350 psi, or about 400 psi, or about 450 psi, or about 500 psi, when measured by the Average Puncture Pressure Failure Test described hereinbelow.

The at least two reinforcing layers may be in direct contact. Alternatively, the at least two reinforcing layers may not be in contact with each other. The at least two reinforcing layers may be separated by a distance d. In embodiments in which the at least two reinforcing layers are in direct contact, the distance d may be about 0 μm. The distance d may be from about 0.1 μm to about 20 μm, or from about 0.1 μm to about 15 μm, or from about 0.1 μm to about 10 μm, or from about 10 μm to about 20 μm, or from about 10 μm to about 15 μm, or from about 15 μm to about 20 μm, or from about 2 μm to about 8 μm, or from about 2 μm to about 6 μm, or from about 2 μm to about 4 μm, or from about 4 μm to about 8 μm, or from about 6 μm to about 8 μm, from about 3 μm to about 6 μm, or from about 0.5 μm to about 10 μm, or from about 1 μm to about 10 μm, or from about 4 μm to about 6 μm, or from about 1 μm to about 5 μm, or from about 5 μm to about 10 μm. The distance d may be about 0.1 μm, or about 0.5 μm, or about 1 μm, or about 2 μm, or about 3 μm, or about 4 μm, or about 5 μm, or about 6 μm, or about 7 μm, or about 8 μm, or about 9 μm, or about 10 μm, or about 11 μm, or about 12 μm, or about 13 μm, or about 14 μm, or about 15 μm, or about 16 μm, or about 17 μm, or about 18 μm, or about 19 μm, or about 20 μm.

The at least two reinforcing layers may be separated by at least one layer of Ion Exchange Material (IEM). Each of the at least one layer of ion exchange material may comprise a single ion exchange material. Each of the at least one layer of ion exchange material may comprise a mixture of two or more ion exchange materials. Each of the at least one layer of ion exchange material may comprise at least one ionomer. The at least one ionomer may comprise a proton conducting polymer. The proton conducting polymer may comprise hydrocarbon ionomer. The proton conducting polymer may comprise perfluorinated ionomer. The proton conducting polymer may comprise perfluorosulfonic acid. Each of the at least one layer of ion exchange material may be from about 1 μm to about 10 μm thick. The ion exchange material may have an equivalent volume from about 240 cc/mole eq to about 870 cc/mole eq, or from about 240 cc/mole eq to about 650 cc/mole eq, or from about 350 cc/mole eq to about 475 cc/mole eq. The ion exchange material may have a density not lower than about 1.9 g/cc at 0% relative humidity.

The at least two reinforcing layers may be separated by one layer of Ion Exchange Material (IEM). The layer of ion exchange material may comprise a single ion exchange material. The layer of ion exchange material may comprise a mixture of more than one ion exchange materials.

The at least two reinforcing layers may be separated by two or more layers of ion exchange material. At least two of the two or more layers of ion exchange material may comprise different ion exchange materials. At least two of the two or more layers of ion exchange material may comprise the same ion exchange materials.

The at least two reinforcing layers may be separated by a layer of Ion Exchange Material (IEM), wherein the ion exchange material comprises more than one layer of ion exchange material, and wherein the layers of ion exchange material disposed between the at least two reinforcing layers are formed of different ion exchange material.

Each of the at least two reinforcing layers may have a first surface and a second surface and at least one or both of the first surface and the second surface of each reinforcing layers may be at least partially impregnated with ion exchange material.

In embodiments in which the composite membrane comprises two reinforcing layers, the first reinforcing layer may comprise a first surface and a second surface, and the second reinforcing layer may comprise a first surface and a second surface. The first surface of the first and second reinforcing layers may be at least partially impregnated with ion exchange material. The second surface of the first and second reinforcing layers may be at least partially impregnated with ion exchange material.

In embodiments in which both the first surface of the first reinforcing layer and the second surface of the second reinforcing layer are at least partially impregnated with ion exchange material, the ion exchange material of the first surface of the first reinforcing layer may be the same or different to the ion exchange material of the second surface of the second reinforcing layer.

The microporous polymer structure may be partially imbibed with the ion exchange material. The microporous polymer structure may be fully imbibed with the ion exchange material. In embodiments in which the composite membrane has two reinforcing layers, the microporous polymer structure of the two reinforcing layers may be fully imbibed with ion exchange material. In addition, the composite membrane may comprise two additional layers of ion exchange material on first and second surfaces of the composite membrane. In addition, the first and second reinforcing layers may be are separated from each other by another (internal) layer of ion exchange material. In one embodiment the at least two reinforcing layers may be separated from each other by another (internal) layer of ion exchange material forming the distance d. The layers of ion exchange material disposed on the first surface of the composite membrane, the second surface of the composite membrane, and/or between the two reinforcing layers may comprise the same or different ion exchange materials. For example, the ion exchange materials may be ionomers.

In embodiments in which the microporous polymer structure of at least one of the reinforcing layers is partially imbibed with the ion exchange material, the ion exchange material may leave a non-occlusive portion of the microporous polymer structure closest to the first surface, second surface or both surfaces of said reinforcing layer. The non-occlusive portion may be a portion of the microporous polymer structure which is free of any ion exchange material. Alternatively, the non-occlusive portion may be a portion of the microporous polymer structure which may comprise a coating of ion exchange material to an internal surface of the microporous polymer structure, but no ion exchange material on an external surface of the microporous polymer structure (i.e. the composite membrane does not comprise any layers of unreinforced ion exchange material but it may comprise ion exchange material coating the interior fibrils of the microporous polymer structure).

The total average equivalent volume of ion exchange material may be from about 240 cc/mol eq to about 870 cc/mole eq. The average equivalent volume of the ion exchange material may be from about 240 cc/mole eq to about 650 cc/mole eq. The average equivalent volume of the ion exchange material may be from about 350 cc/mole eq to about 475 cc/mole eq. The total average equivalent volume of ion exchange material may comprise the total volume of ion exchange material distributed between all the ion exchange material layers of the composite membrane.

The ion exchange material may have a total equivalent weight (EW) from about 400 g/eq to about 2000 g/eq $SO_3^-$. The ion exchange material may have a total equivalent weight (EW) from about 470 g/eq to about 1275 g/eq $SO_3^-$. The ion exchange material may have a total equivalent weight (EW) from about 700 g/eq to about 1000 g/eq $SO_3^-$. The ion exchange material may have an equivalent weight of about 710 g/eq $SO_3^-$. The ion exchange material may have an equivalent weight of about 810 g/eq $SO_3^-$. The ion exchange material may have an equivalent weight of about 910 g/eq $SO_3^-$.

In embodiments in which the composite membrane comprises two reinforcing layers disposed directly in contact, the second surface of the first reinforcing layer and the first surface of the second reinforcing layer may be in direct contact.

In embodiments in which the composite membrane comprises two reinforcing layers disposed separated from each other, the second surface of the first reinforcing layer and the first surface of the second reinforcing layer may be separated by a distance d by a layer of ion exchange material (i.e. an internal layer of ion exchange material). The internal layer of ion exchange material may have a thickness d.

The composite membrane may comprise a first surface and a second (opposite) surface. The first surface of the composite membrane may comprise a first ion exchange material. The second surface of the composite membrane may comprise a second ion exchange material. The composite membrane may comprise at least one internal layer of ion exchange material between the at least two reinforcing layers.

In embodiments in which the composite membrane comprises three or more reinforcing layers, all the reinforcing layers may be in direct contact with each other. Alternatively, some of the reinforcing layers may be in direct contact with each other, while some of the reinforcing layers may be separated from each other (e.g. by a layer of ion exchange material). Alternatively, all of the reinforcing layers may be separated from each other. In embodiments comprising reinforcing layers which are separated from each other, the reinforcing layers may be separated from each other by ion exchange material. For example, the composite membrane may comprise three or more reinforcing layers, each reinforcing layer separated from the next reinforcing layer by one or more layers of ion exchange material. In addition, the external reinforcing layers may be at least partially impregnated with ion exchange material on their outer surfaces.

The composite membrane may comprise at least one ion exchange material on each of its outer surfaces. In addition, the composite membrane may comprise at least one internal ion exchange material between the at last two reinforcing layers. The at least one ion exchange material may be unreinforced ion exchange material. Within the context of this disclosure, an unreinforced ion exchange material may be a layer of ion exchange material present substantially not embedded within a reinforcing layer. In other words, in a composite membrane having one or more reinforcing layers, the unreinforced ion exchange material is a layer of ion exchange material present somewhere within the composite membrane (e.g. on an outer surface or as an internal layer) but which is substantially not embedded (or imbibed) within the one or more reinforcing layers.

The composite membrane may further comprise a backer layer disposed on the first surface of the composite membrane, the second surface of the composite membrane, or both. A suitable backer layer may comprise at least one support structure which may comprise woven materials which may include, for example, scrims made of woven fibers of expanded porous polytetrafluoroethylene; webs made of extruded or oriented polypropylene or polypropylene netting, commercially available from Conwed, Inc. of Minneapolis, Minn.; and woven materials of polypropylene and polyester, from Tetko Inc., of Briarcliff Manor, N.Y. Suitable non-woven materials may include, for example, a spun-bonded polypropylene from Reemay Inc. of Old Hickory, Tenn. In other aspects, the support structure can include web of polyethylene ("PE"), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). In some aspects, the support structure also includes a protective layer, which can include polyethylene (PE), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). Support structure may optionally include a reflective layer that includes a metal substrate (e.g., an aluminum substrate). The specific metal chosen may vary widely so long as it is reflective. A non-limiting list of exemplary metals includes aluminum, beryllium, cerium, chromium, copper, germanium, gold, hafnium, manganese, molybdenum, nickel, platinum, rhodium, silver, tantalum, titanium, tungsten, zinc, or alloys such as Inconel or bronze. The reflective layer optionally comprises a mixture or alloy of two or more metals, optionally two or more of the metals listed above. The reflective layer optionally can include a high reflectivity polymeric multilayer film such as Vikuiti™ Enhanced Specular Reflector available from 3M company. In yet another example, the reflective layer optionally can include a high reflectivity non-metal inorganic dielectric multilayer film comprised of materials such as, for example, magnesium fluoride, calcium fluoride, titanium dioxide, silicon dioxide.

In another aspect, there is provided a membrane electrode assembly for an electrochemical device, comprising:

at least one electrode; and the composite membrane as described hereinabove in contact with the at least one electrode.

The composite membrane may be attached to the at least one electrode. The composite membrane may be adhered to the at least one electrode. The composite membrane may be attached to the at least one electrode. The composite membrane may be pressed against the at least one electrode. The composite membrane may be fused to the at least one electrode.

The at least one electrode may comprise fibers. The at least one electrode may be a fibrous electrode. The at least one electrode may be doped with fibers. The at least one electrode may comprise carbon fibers. The at least one electrode may comprise a porous layer (typical pore size 1-200 micron). The porous layer may comprise, among others, a felt, a paper, or a woven material.

The membrane electrode assembly may be a redox flow battery membrane electrode assembly comprising:

a first electrode; a second electrode; and a composite membrane as described hereinabove sandwiched between the first electrode and the second electrode.

The membrane electrode assembly may be a redox flow battery membrane electrode assembly comprising:

a first electrode with a first surface and a second surface;

a second electrode with a first surface and a second surface; and a composite membrane with a first surface and a second surface as described hereinabove, wherein the second surface of the first electrode is in contact with the first surface of the composite membrane and the first surface of the second electrode is in contact with the second surface of the composite membrane.

The first electrode may be a first electrode layer and the second electrode may be a second electrode layer. The redox flow battery membrane electrode assembly may comprise a first electrode layer attached to the first surface of the composite membrane and a second electrode layer attached to a second surface of the composite membrane. The electrode may be a porous layer having a pore size from about 1 to about 200 μm. The electrode may be selected from a felt, a paper or a woven material. The electrode may comprise doped carbon fibers.

The membrane electrode assembly may be a fuel cell membrane electrode assembly comprising:

a composite membrane as described herein above, wherein the composite membrane has a first surface and a second surface;

a first layer of electrode catalyst adhered to the first surface of the composite membrane; and a second layer of electrode catalyst adhered to the second surface of the composite membrane.

The fuel cell membrane electrode assembly may further comprise a fluid diffusion layer. The fluid diffusion layer may be a gas diffusion layer and/or a liquid (e.g. water) diffusion layer. The fluid diffusion layer may be disposed on an outer surface of the first layer of electrode catalyst and/or the second layer of electrode catalyst. The fuel cell membrane electrode assembly may comprise:

a composite membrane as described hereinabove, wherein the composite membrane has a first surface and a second surface:

a first layer of electrode catalyst adhered to the first surface of the composite membrane and a first fluid diffusion layer disposed on the first layer of electrode catalyst; and a second layer of electrode catalyst adhered to the second surface of the composite membrane and a second fluid diffusion layer disposed on the second layer of electrode catalyst.

In the fuel cell membrane electrode assembly, the first fluid diffusion layer may be disposed opposite to the composite membrane. The first layer of electrode catalyst may be disposed between the composite membrane and the first fluid diffusion layer. The second first fluid diffusion layer may be disposed opposite to the composite membrane. The second layer of electrode catalyst may be disposed between the composite membrane and the second fluid diffusion layer. In other words, the first and second fluid diffusion layers may be the outermost layers of the fuel cell membrane electrode assembly and they may sandwich the composite membrane and first and second layers of electrode catalyst.

In the fuel cell membrane electrode assembly, the first and second layers of electrode catalyst may be nanoporous layers having a pore size of up to about 100 nm. The first and second electrode catalyst layers are adhered to the composite membrane. The first layer of electrode catalyst may be an anode and the second layer of electrode catalyst may be a cathode.

In the fuel cell membrane electrode assembly, the first and second layers of electrode catalyst comprise:

one or more ionomers;

a catalyst support such as carbon black; and platinum.

The membrane electrode assembly may be an electrolyzer electrode assembly comprising:

the composite membrane described herein having a layer of catalyst laminated on the composite membrane;

an electrode; and a gas diffusion layer disposed between the composite membrane and the electrode.

The membrane electrode assembly may be an electrolyzer electrode assembly comprising:

a composite membrane as described hereinabove, wherein the composite membrane has a first surface and a second surface, a first layer of electrode catalyst adhered to the first surface of the composite membrane; and a second layer of electrode catalyst adhered to the second surface of the composite membrane. A fluid (e.g. gas/water) diffusion layer may be disposed on the outside surfaces of the electrode catalyst.

In another aspect there is provided an electrochemical device comprising a composite membrane as described hereinabove. The electrochemical device may be a fuel cell, a redox flow battery or an electrolyzer.

In another aspect there is provided a fuel cell comprising a composite membrane or a fuel cell membrane electrode assembly as described hereinabove.

In another aspect there is provided a redox flow battery comprising a composite membrane or a redox flow battery membrane electrode assembly as described hereinabove.

In another aspect there is provided an electrolyzer comprising a composite membrane or an electrolyzer membrane electrode assembly as described hereinabove.

The inventors have endeavored to solve the problems of low piercing resistance of state of the art PEMs, as mentioned above. As a consequence, they surprisingly found that increasing the reinforcing microporous polymer structure content (i.e. the total content of microporous polymer structure distributed among at least two reinforcing layers) in composite membranes continually increase piercing resistance. Surprisingly, this increased piercing resistance may be achieved without increasing the thickness of the composite membranes or increasing the amount of ionomer employed.

Furthermore, the inventors found that for a given total content of reinforcing microporous polymer structure, providing the microporous polymer structure in a multilayer arrangement of reinforcing layers (at least two layers) significantly improves the piercing resistance of the composite membranes compared to polymer electrolyte membranes with equivalent content of microporous polymer structure provided in a single layer.

Providing composite membranes which are highly resistant to piercing decreases the potential for battery failure due to shorts occurring if the composite membranes are pierced upon cell assembly. It may also increase the lifetime of the electrochemical devices fabricated with said composite membranes by decreasing the occurrence of shorts. Furthermore, providing composite membranes that are highly resistant to piercing by other electrochemical device components without increasing the thickness of the composite membrane enables the ion conductance of the composite membranes to remain high and reduces the cost of manufacture, given that thin composite membranes require a lower content of ionomer having a comparable fraction of reinforcement.

BRIEF DESCRIPTION OF THE FIGURES

FIG. 11 shows Table 1, presenting the properties of the composite membranes of the examples.

FIG. 12 shows Table 2, presenting the properties of microporous polymer structures used in the composite membranes of the examples.

DETAILED DESCRIPTION

Figure 1A:
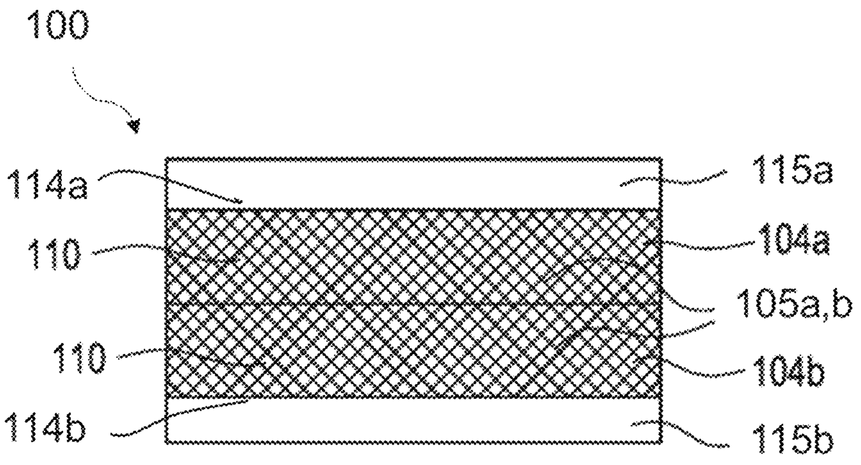
FIG. 1A shows a schematic representation of the cross-section of a composite membrane according to an embodiment of the disclosure. The composite membrane has two reinforcing layers in direct contact with each other. Each of the reinforcing layers comprises a microporous polymer structure. The composite membrane also comprises two external layers of unreinforced ion exchange material. In this particular example, both reinforcing membranes are impregnated with the same ion exchange material (although in other examples the reinforcing layers may be impregnated with different ion exchange materials).

This application discloses composite membranes for electrochemical devices with improved average failure pressure compared to state of the art composite membranes, which leads to an improved puncture resistance of the composite membrane by other components of the electrochemical device upon device assembly. Without wishing to be bound by theory, providing composite membranes with at least two reinforcing layers, each of said at least two reinforcing layers comprising a microporous polymer structure contributes significantly to the improvement in puncture resistance of the composite membrane compared to composite membranes of similar thickness and content of microporous polymer structure provided in a single reinforcing layer. In addition, for any given composite membrane thickness, increasing the total content of microporous polymer structure distributed between two or more reinforcing layers further improves the piercing resistance of the composite membrane. Without wishing to be bound by theory, providing a separation between at least two reinforcing layers within the composite membrane for any given microporous polymer content and thickness of composite membrane may further improve the piercing resistance of the composite membrane.

In some embodiments there is provided a composite membrane for an electrochemical device, comprising:

a) at least two reinforcing layers, each of said at least two reinforcing layers comprising a microporous polymer structure; and b) an ion exchange material (IEM) at least partially imbibed within the microporous polymer structure of the at least two reinforcing layers and rendering the microporous polymer structure occlusive; wherein the composite membrane has a thickness at 0% RH of at least about 10 μm.

Embodiments have been described using volume-based values in order to provide a way for meaningful comparison between the composition of composite membranes comprising ionomers and microporous polymer structures of different densities.

In order to provide meaningful values of the content of microporous polymer structure within a composite membrane, but providing these values independently from the intrinsic molecular weight/matrix skeletal density of the microporous polymer structures, embodiments have been described using normalized total mass per area values. This takes into account that some embodiments may comprise different microporous polymer structures within the reinforced layers. The content of the of microporous polymer structure within a composite membrane has also been presented in mass per area values, which is a suitable measurement in embodiments comprising a single type of microporous polymer structure.

The microporous polymer structure may be present in a total content of at least about 20 vol % based on the total volume of the composite membrane. The composite membrane may have a total microporous polymer structure content of at least about $3 \cdot 10^{-6}$ m (i.e. at least about 3 μm) based on the total area of the composite membrane divided by the matrix skeletal density of the microporous polymer structure.

Various definitions used in the present disclosure are provided below.

As used herein, the terms “ionomer” and “ion exchange material” refer to a cation exchange material, an anion exchange material, or an ion exchange material containing both cation and anion exchange capabilities. Mixtures of ion exchange materials may also be employed. Ion exchange material may be perfluorinated or hydrocarbon-based. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl) (fluorosulfonyl)imides, polyvinyl alcohol, polyethylene oxides, divinyl benzene, metal salts with or without a polymer, and mixtures thereof. In exemplary embodiments, the ion exchange material comprises perfluorosulfonic acid (PFSA) polymers made by copolymerization of tetrafluoroethylene and perfluorosulfonyl vinyl ester with conversion into proton form.

As used herein, the “equivalent weight” (EW) of an ionomer or ion exchange material refers to the weight of polymer (in molecular mass) in the ionomer per sulfonic acid group. Thus, a lower equivalent weight indicates a greater acid content. The equivalent weight of the ionomer refers to the EW if that ionomer were in its proton form at 0% RH with negligible impurities. The term “ion exchange capacity” refers to the inverse of equivalent weight (1/EW).

As used herein, the “equivalent volume” of an ionomer or ion exchange material refers to the volume of the ionomer per sulfonic acid group. The equivalent volume (EV) of the ionomer refers to the EV if that ionomer were pure and in its proton form at 0% RH, with negligible impurities.

As used herein, the term “microporous polymer structure” refers to a polymeric matrix that supports the ion exchange material, adding structural integrity and durability to the resulting composite membrane. In some exemplary embodiments, the microporous polymer structure comprises expanded polytetrafluoroethylene (ePTFE) having a node and fibril structure. In other exemplary embodiments, the microporous polymer structure comprises track etched polycarbonate membranes having smooth flat surfaces, high apparent density, and well defined pore sizes.

As used herein, an interior volume of a microporous polymer structure is referred to as occlusive or “substantially occlusive when said interior volume has structures that is characterized by low volume of voids, less than 10% by volume, and being highly impermeable to gases, Gurley numbers larger than 10000 s. Conversely, interior volume of microporous polymer structure is referred to as “non-occluded” when said interior volume has structures that is characterized by large volume of voids, more than 10% by volume, and being permeable to gases, Gurley numbers less than 10000 s.

Composite Membranes

As illustrated in FIGS. 1-9, the composite membrane may include a plurality, e.g., two or more, imbibed reinforcing layers.

As shown in FIGS. 1-4, a composite membrane 100, 200, 300, 400 is provided that includes a two reinforcing layers 105*a,b*, 205*a,b*, 305*a,b*, 405*a,b*, each reinforcing layer comprising a microporous polymer structure and an ion exchange material (e.g. ionomer) 110, 210*a,b*, 310, 410 impregnated in the microporous polymer structures of the reinforcing layers 105*a,b*, 205*a,b*, 305*a,b*, 405*a,b*. That is, each of the microporous polymer structures of the reinforcing layers 105*a,b*, 205*a,b*, 305*a,b*, 405*a,b* is imbibed with the ion exchange material 110, 210*a,b*, 310, 410. The ion exchange material 110, 210*a,b*, 310, 410 may substantially impregnate or occlude the microporous polymer structures of the reinforcing layers 105*a,b*, 205*a,b*, 305*a,b*, 405*a,b* so as to render the interior volume substantially occlusive (i.e. the interior volume having structures that is characterized by low volume of voids and being highly impermeable to gases). For example, by filling greater than 90% of the interior volume of the microporous polymer structure of each of the reinforcing layers 105*a,b*, 205*a,b*, 305*a,b*, 405*a, b* with the ion exchange material 110, 210*a,b*, 310, 410, substantial occlusion will occur, and the composite membrane will be characterized by Gurley numbers larger than 10000 s. As shown in FIGS. 1-4, the ion exchange material 110, 210*a,b*, 310, 410 is securely adhered to the internal and external surfaces of the microporous polymer structure of the reinforcing layers 105*a,b*, 205*a,b*, 305*a,b*, 405*a,b* forming imbibed reinforcing layers 104*a,b*, 204*a,b*, 304*a,b*, and 404*a,b*.

Figure 4:
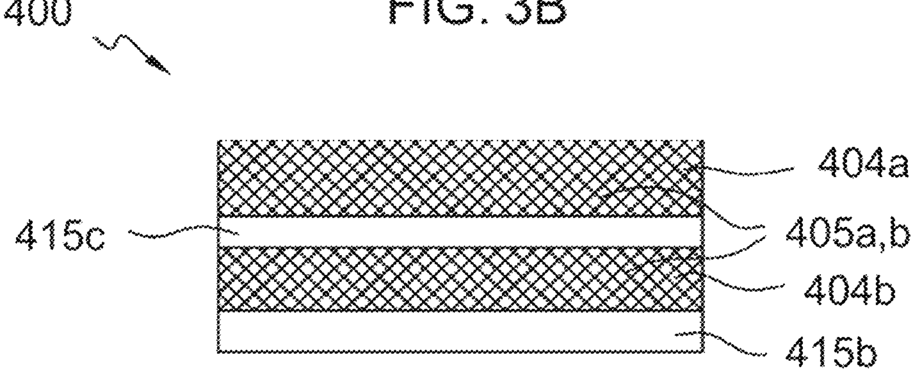
FIG. 4 shows a schematic representation of a cross-section of a composite membrane according to another embodiment of the disclosure. The construction is similar to that of the membrane of FIG. 3 (having two reinforcing layers impregnated with ion exchange material, the reinforcing layers being separated by an internal layer of unreinforced ion exchange material arranged between the two reinforcing layers). This composite membrane has a single layer of unreinforced ion exchange material on the outer surface of one of the reinforcing layers, but no layer of unreinforced ion exchange material on the opposite side (i.e. on the outer surface of the other reinforcing layer).
Figure 5:
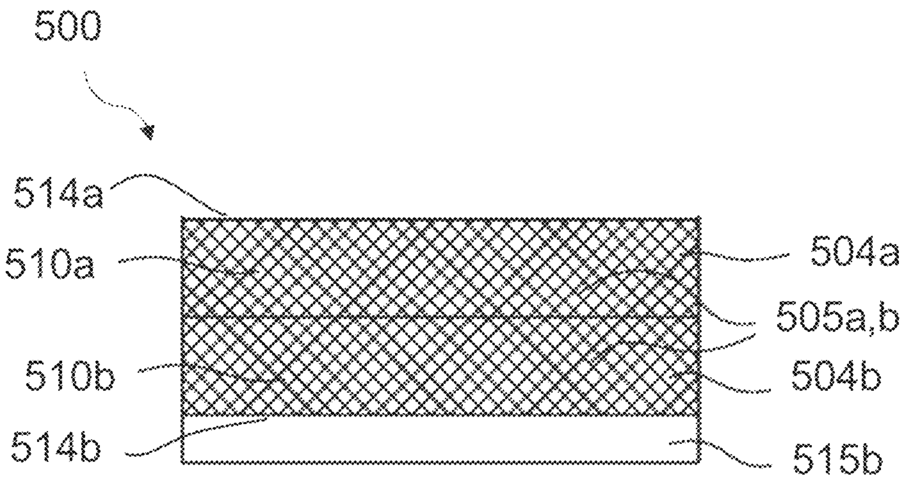
FIG. 5 shows a schematic representation of a cross-section of a composite membrane according to another embodiment of the disclosure. The construction is similar to that of the membrane of FIG. 1, with two reinforcing layers in direct contact with each other without an intervening unreinforced ion exchange material layer. In this example, the composite membrane has a single layer of unreinforced ion exchange material on one outer side but no layer of unreinforced ion exchange material on the opposite side (i.e. the outer surface of one of the reinforcing layers is coated with a layer of unreinforced ion exchange material, but the outer surface of the other reinforcing layer is not coated with a layer of unreinforced ion exchange material).
Figure 6:
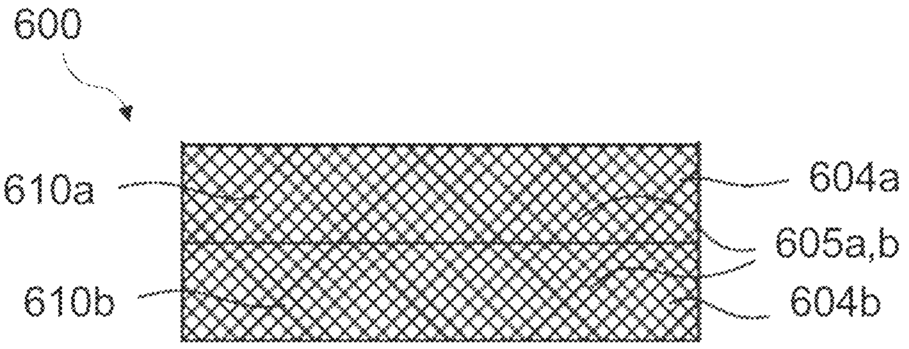
FIG. 6 shows a schematic representation of a cross-section of a composite membrane according to another embodiment of the disclosure. The construction is similar to that of the membrane of FIG. 1, with two reinforcing layers in direct contact with each other without any intervening unreinforced ion exchange material layers and no outer layers of unreinforced ion exchange material.

In some embodiments, the ion exchange material 110, 210*a*, 210*b*, 310, 410 in addition to being impregnated in the microporous polymer structures of the two reinforcing layers 105*a,b*, 205*a,b*, 305*a,b* forming imbibed reinforcing layers 104*a,b*, 204*a,b*, 304*a,b*, 404*a,b*, is provided as one or more additional layers 115*a,b*, 215*a,b*, 315*a,b*, 415*a,b* on one or more external surfaces of the imbibed reinforcing layer 104*a,b*, 204*a,b*, 304*a,b*, 404*a,b*. In other embodiments, the ion exchange material 410, 510 is provided only on one of the external surfaces of the imbibed reinforcing layer 404*b*, 504*b*, but not the other external surface of the composite membrane (i.e. not on the external surface of the opposite imbibed reinforcing layer 404*a*, 504*a*) (FIGS. 4 and 5). In other embodiments, the ion exchange material 610 is only provided impregnated in the microporous polymer structure 605 within the imbibed reinforcing layer 604*a,b*, i.e., without any additional layers of unreinforced ion exchange material, (FIG. 6). Nonetheless, the composite membrane 100, 200, 300, 400, 500, 600 may be characterized by the microporous polymer structures 105*a,b*, 205*a,b*, 305*a,b*, or 405*a,b*, 500*a,b*, 600*a,b* occupying greater than 20% of the total volume of the composite membrane 100, 200 300, 400, 500, 600, 700, 800, 900 which total volume includes the volume of the imbibed reinforcing layers and the volume of any additional layers of unreinforced ion exchange material 115*a,b*, 215*a,b*, 315*a,b,c*, 415*b,c*, 515*b*, 715*a,b* and 815*a,b,c,d* if present.

Figure 1B:
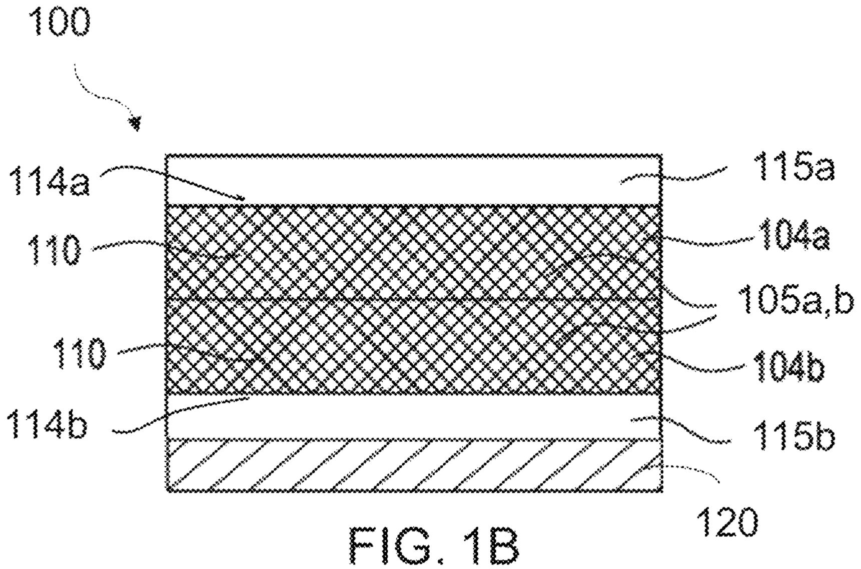
FIG. 1B shows the composite membrane of FIG. 1A with a backer layer.

In embodiments according to FIGS. 1A and 1B, a first imbibed reinforcing layer 104*a* may be formed by imbibing the microporous polymer structure of a first reinforcing layer 105*a* with the ion exchange material 110, and a second imbibed reinforcing layer 104*b* may be formed by imbibing the microporous polymer structure of a second reinforcing layer 105*b* with the same ion exchange material 110. For example, ion exchange material 110 may be imbibed into the microporous polymer structure of the first reinforcing layer 105*a* to form the first imbibed reinforcing layer 104*a*, and the same ion exchange material may be imbibed into the microporous polymer structure of the second reinforcing layer 105*b* to form the second imbibed reinforcing layer 104*b*. In this embodiment, the reinforcing layers 105*a* and 105*b* are in direct contact. In this embodiment, the composite layer has two external layers of ion exchange material 115*a* and 115*b* formed on the external surfaces 114*a* and 114*b* of the imbibed reinforcing layers 04*a* and 104*b*. The layers of ion exchange material 115*a* and 115*b* may comprise the same ion exchange material as the imbibed reinforcing layers 104*a* and 104*b*. Alternatively, the ion exchange material of one or both layers 115*a* and/or 115*b* may be different to that of the imbibed reinforcing layers 104*a* and 104*b*. The ion exchange material of both layers 115*a* and 115*b* may be the same or different.

Although only shown in FIG. 1B, in embodiments according to any one of the constructions shown in the figures, the composite membrane 100 may be provided on a backer layer 120 (FIG. 1B). The backer layer 120 may include a release film such as, for example, cycloolefin copolymer (COC) layer. In some embodiments, the composite membrane 100 may be released (or otherwise uncoupled) from the backer layer 120 prior to being incorporated in a membrane electrode assembly (MEA).

Figure 2:
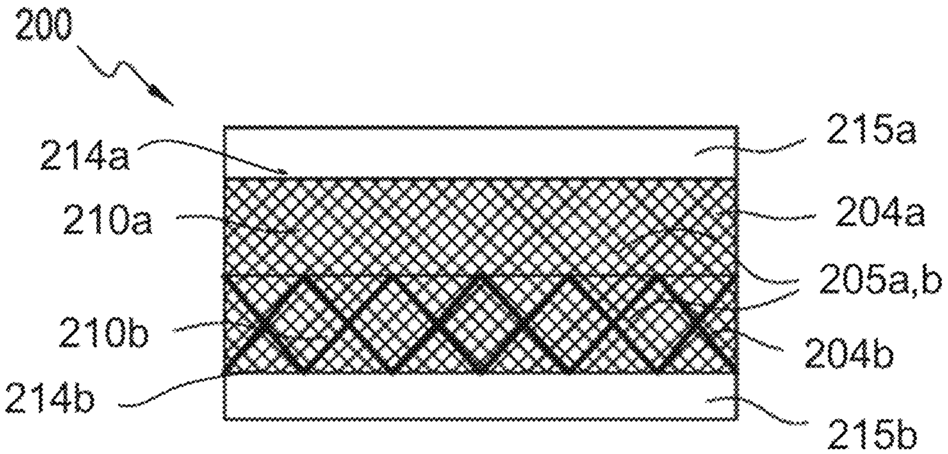
FIG. 2 shows a schematic representation of the cross-section of a composite membrane according to another embodiment. The composite membrane has a similar construction to the composite membrane of FIGS. 1A and 1B, but the first reinforcing layer is impregnated with a first ion exchange material and the second reinforcing layer is impregnated with a second (different) ion exchange material.

In embodiments according to FIG. 2, the composite membrane 200 may have a similar construction to that of embodiments according to FIG. 1, with two reinforcing layers 205*a*, 205*b* in direct contact with each other. In embodiments according to FIG. 2, the first imbibed reinforcing layer 204*a* may be formed by imbibing the microporous polymer structure of the first reinforcing layer 205*a* with a first ion exchange material 210*a*, and the second imbibed reinforcing layer 204*b* may be formed by imbibing the microporous polymer structure of the second reinforcing layer 205*b* with a second ion exchange material 210*b* that is different from the first ion exchange material 210*a*. In these embodiments, a first ion exchange material 210*a* may be imbibed into the microporous polymer structure of the first reinforcing layer 205*a* to form the first imbibed reinforcing layer 204*a*, and a second ion exchange material 210*b* may be imbibed into the microporous polymer structure of the second reinforcing layer 205*b* to form the second imbibed reinforcing layer 204*b*. In this embodiment, the composite membrane 200 has two external layers of (unreinforced) ion exchange material 215*a* and 215*b* formed on external surfaces 214*a* and 214*b* of the imbibed reinforcing layers 204*a* and 204*b*. The external layers of ion exchange material 215*a* and 2215*b* may comprise the same ion exchange material as at least one of the imbibed reinforcing layers 204*a* or 204*b*. The ion exchange material of both external layers of ion exchange material 215*a* and 215*b* may be the same or different. Alternatively, the ion exchange material of one or both external layers 215*a* and/or 215*b* may be different to that of the imbibed reinforcing layers 204*a* and 204*b*. Although not shown in the figure, the composite membrane may have a backer or release layer. The backer layer may be peeled or removed prior to assembly of the composite membrane in an electrochemical device.

Figure 3A:
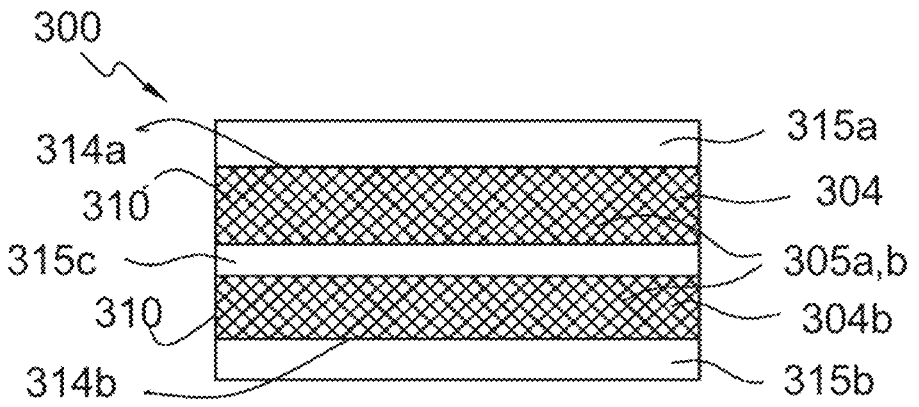
FIG. 3A shows a schematic representation of a cross-section of a composite membrane according to an embodiment of the disclosure. The composite membrane has two reinforcing layers, each reinforcing layer comprising a microporous polymer structure. The two reinforcing layers are separated by an internal unreinforced layer of ion exchange material. The composite membrane also comprises two external layers of unreinforced ion exchange material on the outer surfaces of the reinforcing layers.

In embodiments according to FIG. 3A, composite membrane 300 may comprise two reinforcing layers 305*a* and 305*b* imbibed with ion exchange material 310 to form imbibed reinforcing layers 304*a,b*. Composite membrane 300 may comprise three layers of unreinforced ion exchange material, a first layer 315*a* formed on the external surface 314*a* of the first imbibed reinforcing layer 304*a*, a second layer of unreinforced ion exchange material 315*b* formed on the external surface 314*b* of the second imbibed reinforcing layer 304*b*, and a third (internal) layer of unreinforced ion exchange material 315*b* disposed between imbibed reinforcing layers 304*a* and 304*b*. The ion exchange material of the unreinforced ion exchange material layers 315*a,b,c* may be the same or different, and it may be the same or different to the ion exchange material 310 of the imbibed reinforcing layers 304*a* and/or 304*b*.

Figure 3B:
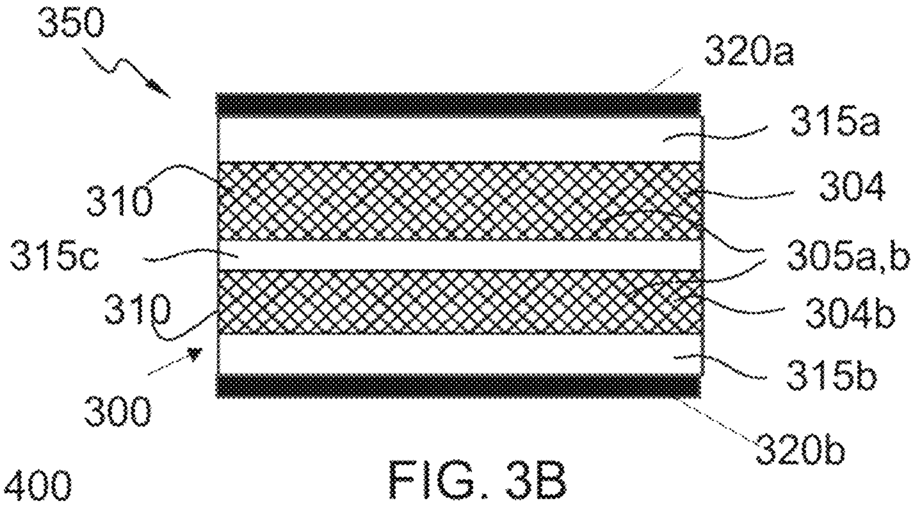
FIG. 3B shows a schematic representation of a cross-section of a redox flow battery membrane-electrode assembly comprising the composite membrane of FIG. 3A and two electrode layers.

FIG. 3B shows a redox flow battery membrane electrode assembly 350 comprising a composite membrane 300 as shown in FIG. 3A sandwiched between two electrode layers 320*a* and 320*b* disposed on the outermost surfaces of the composite membrane 300. In this particular embodiment, the electrode layer 320*a* is disposed on or attached to the outer surface of unreinforced ion exchange material layer 315*a* and electrode layer 320*b* is disposed on or attached to the outer surface of unreinforced ion exchange material layer 315*b*. The electrode layers 320*a,b* may be porous layers having a pore size from about 1 to about 200 μm. The electrode layers 320,*b* may be selected from a felt, a paper or a woven material. The electrode layers 320*a,b* may comprise doped carbon fibers.

FIG. 4 shows a schematic representation of a cross-section of a composite membrane 400 according to another embodiment of the disclosure. The construction is similar to that of the membrane 300 of FIG. 3A (having two reinforcing layers 405*a,b* impregnated with ion exchange material and thus forming imbibed reinforcing layers 304*a* and 304*b*). The imbibed reinforcing layers 304*a,b* are separated by an internal layer of unreinforced ion exchange material 415*c* disposed between the two imbibed reinforcing layers 404*a* and 404*b*. This composite membrane 400 has a single layer of unreinforced ion exchange material 415*b* on the outer surface of imbibed reinforcing layer 404*b*, but no layer of unreinforced ion exchange material on the opposite side (i.e. on the outer surface of the other imbibed reinforcing layer 404*a*).

FIG. 5 shows a schematic representation of a cross-section of a composite membrane 500 according to another embodiment of the disclosure. The construction is similar to that of the membrane of FIG. 1, with two reinforcing layers 505*a*, 505*b* in direct contact with each other without an intervening unreinforced ion exchange material layer. The two reinforcing layers 505*a,b* are imbibed with an ion exchange material 510 to form imbibed reinforcing layers 504*a*, and 504*b*. In this example, the composite membrane 500 has a single layer of unreinforced ion exchange material 515*b* on one outer side of the composite membrane (disposed on outer surface 514*b* of imbibed reinforcing layer 504*b*) but no layer of unreinforced ion exchange material disposed on the opposite side (i.e. the outer surface 514*b* of imbibed reinforcing layer 504*b* is coated with a layer of unreinforced ion exchange material 515*b*, but the outer surface 514*a* of the other reinforcing layer 504*a* is not coated with a layer of unreinforced ion exchange material).

In embodiments according to FIG. 6, the composite membrane 600 may include a plurality, e.g., two or more, imbibed reinforcing layers 604*a* and 604*b* (or more, but not shown) formed by two (or more) reinforcing layers 605*a* and 605*b* comprising microporous polymer structures which may be imbibed with one or more ion exchange materials 610*a* and 610*b*, which may be the same or different. In embodiments according to FIG. 6, the imbibed reinforcing layers may not have external or internal layers of unreinforced ion exchange material. That is, the composite membrane 600 may not comprise any additional layer of unreinforced ion exchange material.

Figure 7:
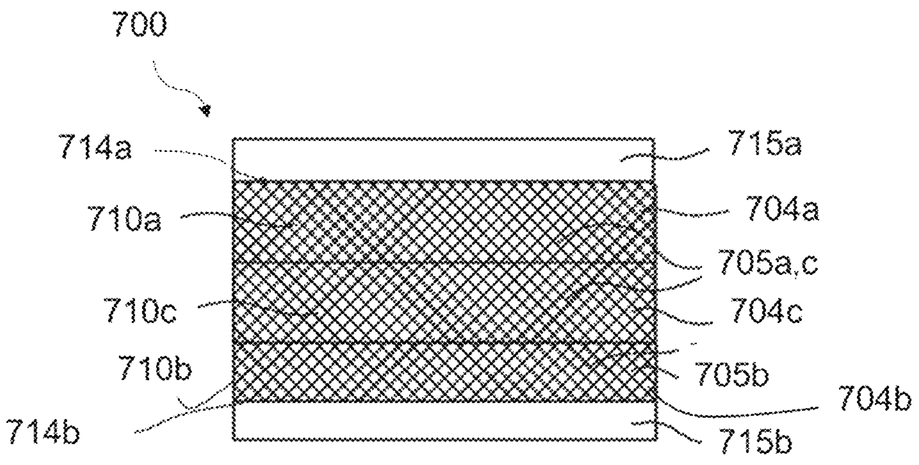
FIG. 7 shows a schematic representation of a cross-section of a composite membrane according to another embodiment of the disclosure. In this embodiment the composite membrane has three reinforcing layers comprising a microporous polymer structure impregnated with an ion exchange material. All three reinforcing layers are in direct contact with each other and the composite membrane has two external layers of unreinforced ion exchange material disposed on opposite external surfaces of the composite membrane.

In embodiments according to FIG. 7, the composite membrane 700 may comprise three imbibed reinforcing layers 704*a*, 704*b* and 704*c*. In these embodiments, the imbibed reinforcing layers are in contact with each other (i.e. there are no internal layers of unreinforced ion exchange material between the imbibed reinforcing layers 704*a*, 704*c*, 704*b*). Each of the imbibed reinforcing layers may comprise a reinforcing layer 705*a,b,c* comprising a microporous polymer structure. The microporous polymer structure of all of the reinforcing layers 705*a,b,c* may be the same. The microporous polymer structure of some of the reinforcing layers 705*a,b,c* may be the same while the microporous polymer structure of at least one of the reinforcing layers 705*a*, 705*b* or 705*c* may be different. The microporous polymer structure of the reinforcing layers 705*a*, 705*b* and 705*c* may be fully or partially imbibed with ion exchange material 710*a*, 710*b* and 710*c* respectively to render the microporous polymer structure occlusive and therefore forming imbibed reinforcing layers 704*a*, 705*b*, and 704*c* respectively. The ion exchange materials may comprise one or more ionomer. Each of the ion exchange materials 710*a*, 710*b* and 710*c* may be the same or may be different to all or some of the other ion exchange materials of the composite membrane. The composite membrane 700 shown in FIG. 7 has a layer of unreinforced ion exchange material 715*a* on the external surface 714*a* of the first imbibed reinforcing layer 704*a*. The composite membrane has another layer of unreinforced ion exchange material 715*b* on the external surface 714*b* of the third imbibed reinforcing layer 704*b* (i.e. the outermost imbibed reinforcing layer opposite reinforcing layer 704*a*).

Figure 8:
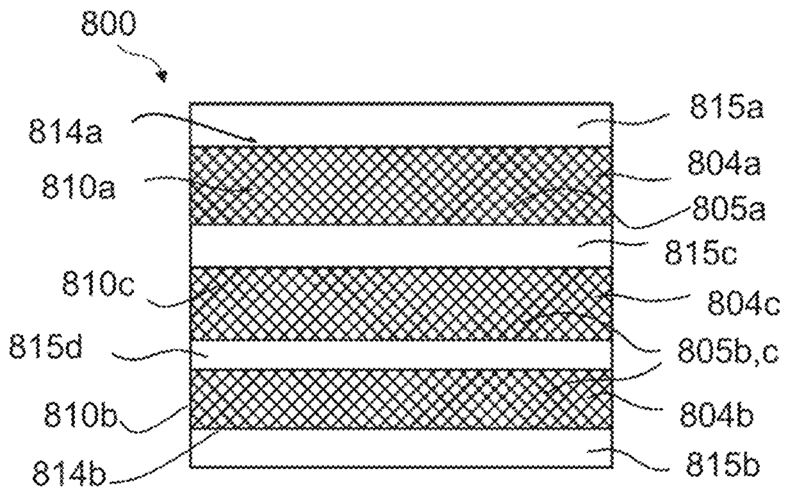
FIG. 8 shows a schematic representation of a cross-section of a composite membrane according to another embodiment of the disclosure. In this embodiment the composite membrane has three reinforcing layers, each reinforcing layer comprising a microporous polymer structure impregnated with an ion exchange material. The reinforcing layers separated from each other by internal layers of unreinforced ion exchange material. The composite membrane has two external layers of unreinforced ion exchange material on opposite external surfaces of the composite membrane.

In embodiments according to FIG. 8, the composite membrane 800 may comprise three imbibed reinforcing layers 804*a*, 804*b* and 804*c*. Each of the imbibed reinforcing layers may comprise a reinforcing layer 805*a*, 805*b*, 805*c* comprising a microporous polymer structure. The microporous polymer structure of all of the reinforcing layers 805*a,b,c* may be the same. The microporous polymer structure of some of the reinforcing layers 805*a,b,c* may be the same while the microporous polymer structure of at least one of the reinforcing layers 805*a*, 805*b* or 805*c* may be different. The microporous polymer structure of the reinforcing layers 805*a*, 805*b* and 805*c* may be fully or partially imbibed with ion exchange material 810*a*, 810*b* and 810*c* respectively to form imbibed reinforcing layers 804*a*, 804*b*, and 804*c* respectively. The ion exchange materials 810*a*, 810*b* and 810*c* may comprise one or more ionomer. Each of the ion exchange materials 810*a*, 810*b* and 810*c* may be the same or may be different to all or some of the other ion exchange materials of the composite membrane. The composite membrane 800 shown in FIG. 8 has a layer of unreinforced ion exchange material 815*a* on the external surface 814*a* of the first imbibed reinforcing layer 804*a*. The composite membrane has another layer of unreinforced ion exchange material 815*b* on the external surface 814*b* of the third imbibed reinforcing layer 804*b*. In addition, in these embodiments there is an internal layer of unreinforced ion exchange material 815*c* between imbibed reinforcing layers 804*a* and 804*c*. There is another internal layer of unreinforced ion exchange material 815*d* between imbibed reinforcing layers 804*c* and 804*b*. The internal layers 815*c,d* form a distance d between imbibed reinforcing layers 804*a* and 804*c* and between imbibed reinforcing layers 804*c* and 804*b*.

Although not specifically shown, other embodiments of composite membranes as described herein may comprise three or more imbibed reinforcing layers each comprising a reinforcing layer comprising a microporous polymer structure and an ion exchange material imbibed or partially imbibed within the microporous polymer material. In some embodiments, the composite membrane may have only one external layer of unreinforced ion exchange material on one of the external surfaces of the composite membrane. In some embodiments, the composite membrane may have external layers of unreinforced ion exchange material on both external surfaces of the imbibed layers. In some embodiments, the composite membrane may have one or more internal layers of unreinforced ion exchange material between at least two of the imbibed reinforcing layers. In some embodiments, the composite membrane may have internal layers of unreinforced ion exchange material between each of the imbibed reinforcing layers. In some embodiments, the composite membrane may have internal layers of unreinforced ion exchange material between each of the imbibed reinforcing layers and a single external layer of unreinforced ion exchange material on one of the external surfaces of the composite membrane. In some embodiments, the composite membrane may have internal layers of unreinforced ion exchange material between each of the imbibed reinforcing layers and external layers of unreinforced ion exchange material on both of the external surfaces of the composite membrane.

The imbibed reinforcing layers of the composite membrane 100, 200, 300, 400, 500, 600, 700, 800, 900 may be constructed with reinforcing layers comprising two (or more) different microporous polymer structures. For example, with reference to FIG. 1, the first imbibed reinforcing layer 104*a* may be formed by imbibing a first reinforcing layer 105*a* comprising a first microporous polymer structure with the ion exchange material 110, and the second imbibed reinforcing layer 104*b* may be formed by imbibing a second reinforcing layer 105*b* comprising a second microporous polymer structure with the same ion exchange material 110. In these embodiments, the first reinforcing layer 105*a* and the second reinforcing layer 105*b* are different. The principle of employing different types of reinforcing layers in the composite membrane architecture may be applied to embodiments according to any of the Figures. For example, in embodiments according to FIG. 2, the first imbibed reinforcing layer 204*a* may be formed by imbibing a first reinforcing layer 205*a* comprising a first microporous polymer structure with a first ion exchange material 210*a*, and the second imbibed reinforcing layer 204*b* may be formed by imbibing a second reinforcing layer 205*b* comprising a second microporous polymer structure 205*b* with a second ion exchange material 210*b*. In these embodiments, the first reinforcing layer 205*a* and the second reinforcing layer 205*b* are different. Therefore, in the composite membranes described herein and shown in the Figures, the first microporous polymer structure may be the same as or different from the second microporous polymer structure. The first ion exchange material may be the same as or different from the second ion exchange material.

In additional embodiments, part of the microporous polymer structure of the reinforcing layers 105*a,b*, 205*a,b*, 305*a,b*, 405*a,b*, 505*a,b*, 605*a,b*, 705*a,b,c*, 805*a,b,c* (e.g. top surface area or bottom surface area) may include a non-occlusive (i.e. the interior volume having structures that is characterized by high volume of voids and being highly permeable to gases) area (not shown in the Figures) that is free or substantially free of the ion exchange material. The location of the non-occlusive area is not limited to the top surface area of the microporous polymer structure. As provided above, the non-occlusive area may be provided on a top surface area of the microporous polymer structure of any or all of the reinforcing layers.

Yet in other embodiments, the non-occlusive area may include a small amount of the ion exchange material present in an internal surface of the microporous polymer structure as a thin node and fibril coating. However, the amount of the ion exchange material may be not large enough to render the microporous polymer structure occlusive, thereby forming the non-occlusive area.

Figure 9:
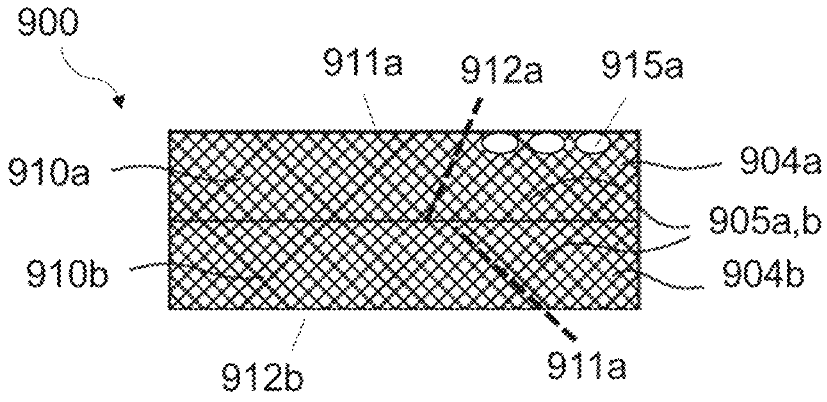
FIG. 9 shows a schematic representation of a composite membrane similar to that of FIG. 6, having two reinforcing layers in direct contact with each other, with one of the reinforcing layers being fully imbibed with ion exchange material and the other reinforcing layer being mostly imbibed with the ion exchange material, but comprising a region of un-imbibed or non-occlusive region of the microporous polymer structure.

FIG. 9 shows a schematic representation of a composite membrane 900 similar to that of FIG. 6, having two reinforcing layers 905*a*, 905*b* in direct contact with each other. Each reinforcing layer 905*a*, 905*b* comprises a microporous polymer structure. Reinforcing layer 905*a* has a first surface 911*a*, and a second surface 912*a*. Similarly, reinforcing layer 905*b* has a first surface 911*b*, and a second surface 912*b*. The microporous polymer structure 905*b* is fully imbibed with an ion exchange material 910*b* forming an occlusive imbibed reinforcing layer 904*b*. However, the microporous polymer structure 905*a* is mostly imbibed with ion exchange material 910*a*, but comprises a region 915*a* of un-imbibed or a non-occlusive area of the microporous polymer structure 905*a* closest to the first surface 911*a* of reinforcing layer 905*a*. Within the context of this disclosure, mostly or substantially imbibed may mean that the microporous polymer structure is about 90% occluded with ion exchange material. Therefore, reinforcing layer 905*a* forms a partially imbibed reinforcing layer 904*a*, which is not fully occlusive. In other similar embodiments (not shown), the first reinforcing layer 905*a* comprises a region 915*a* of un-imbibed or non-occlusive area of the microporous polymer structure 905*a* closest to the second surface 912*b* of reinforcing layer 905*b*.

Yet in other embodiments similar to that of FIG. 9, the first reinforcing layer 905*a* is fully occlusive, but the second reinforcing layer 910*b* comprises a region of un-imbibed or non-occlusive region of the microporous polymer structure 905*a* closest to the first surface 911*b* or the second surface 912*b* of reinforcing layer 910*b*. Yet in other embodiments (not shown), both of the reinforcing layers 910*a* and 910*b* may comprise a region of un-imbibed or a non-occlusive region near one of the surfaces 911*a*, 912*a*, 911*b* or 912*b* of each reinforcing layer 910*a* and 910*b*. The microporous polymer structure of the partially imbibed reinforcing layers 904*a* and/or 904*b* may be about 90% occluded with the ion exchange material.

In embodiments in which there is no internal layer of unreinforced ion exchange material between the at least two reinforcing layers (FIGS. 1A, 1B, 2, 5, 6, 7 and 9) the at least two reinforcing layers may be in direct contact (i.e. the at least two reinforcing layers may be separated by a distance d of about 0 μm.

In embodiments in which the composite membrane comprises internal layers of unreinforced ion exchange material between at least two of the reinforcing layers (FIGS. 2, 3 and 8), the at least two reinforcing layers may be separated by a distance d. The distance d may be from about 1 μm to about 10 μm, or from about 2 μm to about 8 μm, or from about 4 μm to about 6 μm, or from about 1 μm to about 5 μm, or from about 5 μm to about 10 μm, or from about 6 μm to about 8 μm. The distance d may be about 1 μm, or about 2 μm, or about 3 μm, or about 4 μm, or about 5 μm, or about 6 μm, or about 7 μm, or about 8 μm, or about 9 μm, or about 10 μm. The distance d may be the thickness of the internal layer of unreinforced ion exchange material disposed between two contiguous reinforcing layers.

Microporous Polymer Structure

The composite membrane may have at least two reinforcing layers comprising a microporous polymer structure. The composite membrane may have two or more reinforcing layers comprising a microporous polymer structure. For example, the composite membrane may have 2, 3, 4, 5, 6 7, 8, 9 or 10 reinforcing layers, each reinforcing layer comprising a microporous polymer structure.

A suitable microporous polymer structure depends largely on the application in which the composite membrane is to be used. The microporous polymer structure preferably has good mechanical properties, is chemically and thermally stable in the environment in which the composite membrane is to be used, and is tolerant of any additives used with the ion exchange material for impregnation.

As used herein, the term "microporous" refers to a structure having pores. According to various optional embodiments, the pores may have an average pore size from 0.01 to 100 microns, e.g., from 0.05 to 20 microns or from 0.1 to 1 microns.

A suitable microporous polymer structure is intended to refer to a layer having a thickness of at least about 0.1 μm, optionally from about 0.5 μm to about 230 μm, or from about 1 μm to about 100 μm, or from about 1 μm to about 50 μm, and having an average micropore size from about 0.05 μm to about 20 μm, e.g., from 0.1 μm to 1 μm.

A suitable microporous polymer structure of the reinforcing layers 105*a,b*, 205*a,b*, 305*a,b*, 405*a,b*, 505*a,b*, 605*a,b*, 705*a,b,c*, 805*a,b,c*, 905*a,b* for electrochemical applications may include porous polymeric materials. The porous polymeric materials may include fluoropolymers, chlorinated polymers, hydrocarbons, polyamides, polycarbonates, polyacrylates, polysulfones, copolyether esters, polyethylene, polypropylene, polyvinylidene fluoride, polyaryl ether ketones, polybenzimidazoles, poly(ethylene-co-tetrafluoroethylene), poly(tetrafluoroethylene-co-hexafluoropropylene). In some embodiments, the microporous polymer structure of the reinforcing layers includes a perfluorinated porous polymeric material. The perfluorinated porous polymeric material may include polytetrafluoroethylene (PTFE), expanded polytetrafluoroethylene (ePTFE), polyvinylidene fluoride (PVDF), expanded polyvinylidene fluoride (ePVDF), expanded poly(ethylene-co-tetrafluoroethylene) (eEPTFE) or mixtures thereof.

In some embodiments, the microporous polymer structure includes a hydrocarbon material. The hydrocarbon material may include polyethylene, expanded polyethylene, polypropylene, expanded polypropylene, polystyrene, polycarbonate, track etched polycarbonate or mixtures thereof. Examples of suitable perfluorinated porous polymeric materials for use in fuel cell applications include ePTFE made in accordance with the teachings of U.S. Pat. No. 8,757,395, which is incorporated herein by reference in its entirety, and commercially available in a variety of forms from W. L. Gore & Associates, Inc., of Elkton, Md.

In embodiments in which the microporous polymer structure comprises ePTFE, the total mass per area of the microporous polymer structure may be from about 5.5 $g/m^2$ to about 20 $g/m^2$ based on the sum of the mass per area of all microporous layers present in the composite membrane. For example, In embodiments in which the microporous polymer structure comprises ePTFE, the total mass per area of the microporous polymer structure may be about 5.5 $g/m^2$, or about 5.8 $g/m^2$, or about 6 $g/m^2$, or about 7 $g/m^2$, or about 8 $g/m^2$, or about 9 $g/m^2$, or about 10 $g/m^2$, or about 11 $g/m^2$, or about 12 $g/m^2$, or about 13 $g/m^2$, or about 14 $g/m^2$, or about 15 $g/m^2$, or about 16 $g/m^2$, or about 17 $g/m^2$, or about 18 $g/m^2$, or about 19 $g/m^2$, or about 20 $g/m^2$, based on the sum of the mass per area of all microporous layers present in the composite membrane.

Ion Exchange Material

A suitable ion exchange material may be dependent on the application in which the composite membrane is to be used. The ion exchange material preferably has an average equivalent volume from about 240 cc/mole eq to about 870 cc/mole eq, optionally from about 240 cc/mole eq to about 650 cc/mole eq, optionally from about 350 cc/mole eq to about 475 cc/mole eq, and is chemically and thermally stable in the environment in which the composite membrane is to be used. A suitable ionomer may include an ion exchange material such as a cation exchange material, an anion exchange material, or an ion exchange material containing both cation and anion exchange capabilities. In some embodiments, the ion exchange material comprises a proton conducting polymer or cation exchange material. The ion exchange material may perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl) (fluorosulfonyl)imides, polyvinyl alcohol, polyethylene oxides, divinyl benzene, metal salts with or without a polymer and mixtures thereof. Examples of suitable perfluorosulfonic acid polymers include Nafion® (E.I. DuPont de Nemours, Inc., Wilmington, Del., US), Flemion® (Asahi Glass Co. Ltd., Tokyo, JP), Aciplex® (Asahi Chemical Co. Ltd., Tokyo, JP), Aquivion® (SolvaySolexis S.P.A, Italy), and 3M™ (3M Innovative Properties Company, USA) which are commercially available perfluorosulfonic acid copolymers. Other examples of suitable perfluorosulfonic acid polymers include perfluorinated sulfonyl (co)polymers such as those described in U.S. Pat. No. 5,463,005.

Properties of the Composite Membrane

As discussed above, the composite membrane comprises microporous polymer structure and ion exchange material imbibed into the microporous polymer structure thereby forming two distinct materials that achieve improved piercing resistance of the composite membrane. Without wishing to be bound by theory, the piercing resistance of the composite membranes may be influenced by the distribution of the total content of the microporous polymer structure in multiple (i.e. at least two) reinforcing layers compared to the same content of microporous polymer structure provided in a single reinforcing layer within the architecture of the composite membrane. Furthermore, the piercing resistance of the composite membranes may be influenced by the total content of microporous polymer structure within the composite membrane.

The composite membrane may have a thickness at 0% RH of at least about 10 μm, for example from about 10 μm to about 115 μm, or from about 10 μm to about 100 μm, or from about 10 μm to about 90 μm, or from about 10 μm to about 80 μm, or from about 10 μm to about 70 μm, or from about 10 μm to about 60 μm, or from about 10 μm to about 50 μm, or from about 10 μm to about 40 μm, or from about 10 μm to about 30 μm, or from about 10 μm to about 20 μm, or from about 10 μm to about 15 μm, or from about 10 μm to about 12 μm, or from about 20 μm to about 60 μm, or from about 30 μm to about 60 μm, or from about 40 μm to about 60 μm, or from about 12 μm to about 30 μm, or from about 12 μm to about 20 μm, or from about 15 μm to about 30 μm, or from about 15 μm to about 20 μm, or from about 20 μm to about 30 μm. The composite membrane may have a thickness at 0% RH of about 10 μm, or about 11 μm, or about 12, or about 13 μm, or about 14 μm, or about 15 μm, or about 16 μm, or about 17 μm, or about 18 μm, or about 19 μm, or about 20 μm, or about 21 μm, or about 22 μm, or about 23 μm, or about 24 μm, or about 25 μm, or about 30 μm, or about 35 μm, or about 40 μm, or about 45 μm, or about 50 μm, or about 55 μm, or about 60 μm, or about 65 μm, or about 70 μm, or about 75 μm. The composite membrane may not have a thickness at 0% RH below about 10 μm.

In some embodiments, the microporous polymer structure of the reinforcing layers occupies from about 15 vol % to about 70% based on the total volume of the composite membrane, or from about 20 vol % to about 70%, or from about 30 vol % to about 70%, or from about 40 vol % to about 70%, or from about 50 vol % to about 70%, or from about 65 vol % to about 70%, or from about 25 vol % to about 60% or from about 20 vol % to about 50%, or from about 20 vol % to about 40%, or from about 20 vol % to about 30%, or from about 40 vol % to about 60%, or from about 40 vol % to about 50% based on the total volume of the composite membrane. The microporous polymer structure of the reinforcing layers may be present in an amount of about 15 vol %, or about 20 vol %, or about 25 vol %, or about 30 vol %, or about 35 vol %, or about 40 vol %, or about 45 vol %, or about 50 vol %, or about 55 vol %, or about 60 vol %, or about 65 vol %, or about 70 vol %, based on the total volume of the composite membrane.

In some embodiments, the equivalent volume of the ion exchange material 110 is from about 240 cc/mole eq to about 870 cc/mol eq. The ion exchange material may have a total equivalent weight (EW) from about 400 g/eq to about 2000 g/eq $SO_3^-$. In various embodiments, the acid content of the composite membrane 100, 200, 300, 400, 500, 600, 700, 800, 900 is greater than 1.2 meq/cc, for example from 1.2 meq/cc to 3.5 meq/cc at 0% relative humidity. In various embodiments, the thickness of the composite membrane is from about 10 μm to about 115 μm. Specifically, according to embodiments, the thickness of the composite membrane is from about 10 μm to about 115 μm while the acid content of the composite membrane is kept between 1.2 meq/cc to 3.5 meq/cc.

The volume % of the microporous polymer structure of the reinforcing layers in the composite material refers to the space occupied by the microporous polymer structure, which is free of the ionomer. Accordingly, the volume % of the microporous polymer structure in the composite material is different than the imbibed layer which contains ionomer. The volume % of the microporous polymer structure in the composite material is affected by the humidity. Therefore, the experiments discussed below regarding volume % are conducted at dry conditions (e.g. 0% relative humidity (RH)).

In some embodiments, the normalized total content of the microporous polymer structure within the composite membrane may be at least about $3 \cdot 10^{-6}$ m, or about $3.5 \cdot 10^{-6}$ m, or about $4 \cdot 10^{-6}$ m, or about $4.5 \cdot 10^{-6}$ m, or about $5 \cdot 10^{-6}$ m, or about $5.5 \cdot 10^{-6}$ m, or about $6 \cdot 10^{-6}$ m, or about $6.5 \cdot 10^{-6}$ m, or about $7 \cdot 10^{-6}$ m, or about $8 \cdot 10^{-6}$ m, or about $8.5 \cdot 10^{-6}$ m, or about $9 \cdot 10^{-6}$ m based on the total area of the composite membrane.

The equivalent weight of the ion exchange material is also affected by the humidity. Therefore, the experiments discussed below regarding equivalent weight are conducted at dry conditions (e.g. 0% relative humidity (RH)) at an ideal state were presence of water does not affect the value of equivalent volume and meaningful comparison between different ionomers can be drawn.

As provided above, it is surprising and unexpected that the puncture resistance of the composite membrane is dramatically improved by distributing the microporous polymer structure content within two or more reinforcing layers for any given content of microporous polymer structure and composite membrane thickness.

The composite membrane may have an average failure pressure of at least about 150 psi, when measured by the Average Puncture Pressure Failure Test described hereinbelow. For example, the composite membrane may have an average failure pressure of at least about 150 psi, or at least about 160 psi, or at least about 170 psi, or at least about 180 psi, or at least about 190 psi, or at least about 200 psi, when measured by the Average Puncture Pressure Failure Test described hereinbelow.

The composite membrane may have an average failure pressure of from about 150 psi to about 500 psi, when measured by the Average Puncture Pressure Failure Test described hereinbelow, or from about 150 psi to about 450 psi, or from about 150 psi to about 400 psi, or from about 150 psi to about 350 psi, or from about 150 psi to about 300 psi, or from about 200 psi to about 400 psi, or from about 200 psi to about 350 psi, when measured by the Average Puncture Pressure Failure Test described hereinbelow.

The composite membrane may have an average failure pressure of from about 150 psi, or about 200 psi, or about 250 psi, or about 300 psi, or about 350 psi, or about 400 psi, or about 450 psi, or about 500 psi, when measured by the Average Puncture Pressure Failure Test described hereinbelow.

Figure 13:
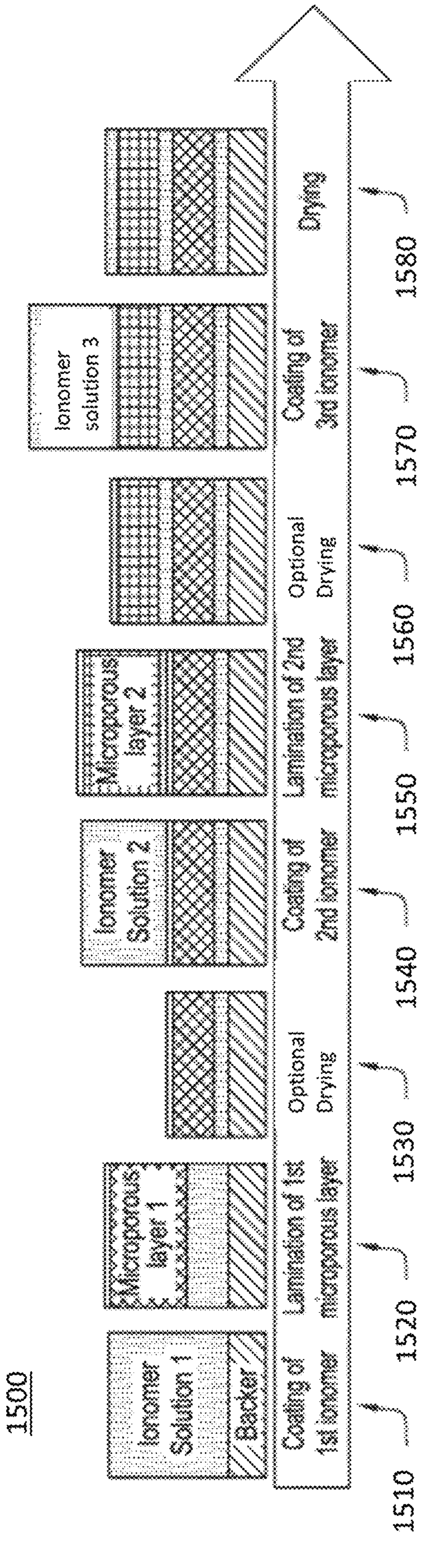
FIG. 13 shows a schematic representation of a method of manufacturing composite membranes according to embodiments of the present disclosure having reinforcing layers separated by internal layers of ion exchange material (ionomer).

The membranes were prepared following a sequential coating process, such as that shown in n FIG. 13. For membranes that have internal layers of ionomer between reinforcing layers, the method 1500 (FIG. 13) comprises the following steps:

1510) coating a backer with a first ionomer solution by providing a backer layer and depositing a liquid layer of the first ionomer solution;

1520) laminating (depositing) a first reinforcing layer comprising a microporous polymer structure over the liquid layer of the first ionomer solution and allowing the microporous polymer structure of the first reinforcing layer to become imbibed or at least partially imbibed with the first ionomer solution;

1530) optionally drying the laminate;

1540) coating the imbibed first reinforcing layer with a liquid layer of a second ionomer solution;

1550) lamination (depositing) a second reinforcing layer comprising a microporous polymer structure over the liquid layer of the second ionomer solution and allowing the microporous polymer structure of the second reinforcing layer to become imbibed or at least partially imbibed with the second ionomer solution;

1560) optionally drying the laminate;

1570) coating the outermost surface of the laminate which is furthest away from the backer with a final liquid layer of a third ionomer solution; and

1580) drying the laminate.

Optionally, the manufacturing method includes repeating steps 1560), 1570) and 1580) with further reinforcing layers and liquid layers of ionomer solution and drying the laminate. For example, for composite membranes comprising three reinforcing layers, a third liquid layer of a third ionomer solution may be deposited over the imbibed second reinforcing layer and applying a third reinforcing layer over the third layer of ionomer solution, and then the laminate may be dried. In some embodiments, the process comprises adding even further ionomer and reinforcing layers, and drying the laminate.

Membrane electrode assemblies may be prepared by depositing electrodes (I.e. anode and cathode) on the composite membranes by any suitable techniques known in the art. For example, solid electrode layers be pressed against the composite membrane by any suitable techniques. Alternatively, (liquid) electrode inks may be applied on the composite membrane. Upon drying the composite, the solvent of the electrode ink may dry to form a solid electrode layer. For the avoidance of doubt, the backer must be removed from the composite membrane before applying a cathode or cathode fluid diffusion layer. The ionomers in the ionomer solutions employed in each of the ionomer layers may be the same or different. The reinforcing layers employed in the electrolyte composite membrane may be all the same, or at least one of the reinforcing layers may be different.

EXAMPLES

Test Procedures and Measurement Protocols Used in Examples

Bubble Point

The Bubble Point was measured according to the procedures of ASTM F316-86. Isopropyl alcohol was used as the wetting fluid to fill the pores of the test specimen. The Bubble Point is the pressure of air required to create the first continuous stream of bubbles detectable by their rise through the layer of isopropyl alcohol covering the microporous polymer matrix. This measurement provides an estimation of maximum pore size.

Non-Contact Thickness

A sample of microporous polymer structure was placed over a flat smooth metal anvil and tensioned to remove wrinkles. Height of microporous polymer structure on anvil was measured and recorded using a non-contact Keyence LS-7010M digital micrometer. Next, height of the anvil without microporous polymer matrix was recorded. Thickness of the microporous polymer structure was taken as a difference between micrometer readings with and without microporous structure being present on the anvil.

Mass-Per-Area

Each Microporous polymer structure was strained sufficient to eliminate wrinkles, and then a 10 $cm^2$ piece was cut out using a die. The 10 $cm^2$ piece was weighed on a conventional laboratory scale. The mass-per-area (M/A) was then calculated as the ratio of the measured mass to the known area. This procedure was repeated 2 times and the average value of the M/A was calculated.

Apparent Density of Microporous Polymer Structure

The apparent density of the microporous polymer structure was calculated using the non-contact thickness and mass-per-area data using the following formula:

$$\text{Apparent density}_{\text{microporous polymer structure}} = \frac{\{M/A_{\text{microporous polymer structure}}\}}{\{\text{non}-\text{contact thickness}\}} = [\text{g/cc}]$$

Porosity of Microporous Polymer Structure

The porosity of the microporous polymer structure was calculated using the apparent density and skeletal density data using the following formula:

$$\text{Porosity}_{\text{microporous polymer structure}} = \frac{\{\text{Apparent density}_{\text{microporous polymer structure}}\}}{\{\text{Skeletal density}_{\text{microporous polymer structure}}\}}$$

Solids Concentration of Solutions of Ion Exchange Material (IEM)

Herein, the terms "solution" and "dispersion" are used interchangeably when referring to ion exchange materials (IEMs). This test procedure is appropriate for solutions in which the IEM is in proton form, and in which there are negligible quantities of other solids. A volume of 2 cubic centimeters of IEM solution was drawn into a syringe and the mass of the syringe with solution was measured via a balance in a solids analyzer (obtained from CEM Corporation, USA). The mass of two pieces of glass fiber paper (obtained from CEM Corporation, USA) was also measured and recorded. The IEM solution was then deposited from the syringe into the two layers of glass fiber paper. The glass fiber paper with the ionomer solution was placed into the solids analyzer and heated up to 160° C. to remove the solvent liquids. Once the mass of the glass fiber paper and residual solids stopped changing with respect to increasing temperature and time, it was recorded. It is assumed that the residual IEM contained no water (i.e., it is the ionomer mass corresponding to 0% RH). After that, the mass of the emptied syringe was measured and recorded using the same balance as before. The ionomer solids in solution was calculated according to the following formula:

$$\left\{\begin{matrix}\text{wt\% solids of}\\ IEM\text{ solution}\end{matrix}\right\} = \frac{\left\{\begin{matrix}\text{Mass of glass fiber paper}\\ \text{with residual solids}\end{matrix}\right\} - \{\text{Mass of glass fiber paper}\}}{\{\text{Mass of full syringe}\} - \{\text{Mass of emptied syringe}\}} = [\text{wt\%}]$$

Equivalent Weight (EW) of an IEM

The following test procedure is appropriate for IEM comprised of a single ionomer resin or a mixture of ionomer resins that is in the proton form (i.e., that contains negligible amounts of other cations), and that is in a solution that contains negligible other ionic species, including protic acids and dissociating salts. If these conditions are not met, then prior to testing the solution must be purified from ionic impurities according to a suitable procedure as would be known to one of ordinary skill in the art, or the impurities must be characterized and their influence on the result of the EW test must be corrected for.

As used herein, the EW of an IEM refers to the case when the IEM is in its proton form at 0% RH with negligible impurities. The IEM may comprise a single ionomer or a mixture of ionomers in the proton form. An amount of IEM solution with solids concentration determined as described above containing 0.2 grams of solids was poured into a plastic cup. The mass of the ionomer solution was measured via a conventional laboratory scale (obtained from Mettler Toledo, LLC, USA). Then, 5 ml of deionized water and 5 ml of 200 proof denatured ethanol (SDA 3C, Sigma Aldrich, USA) is added to ionomer solution in the cup. Then, 55 ml of 2N sodium chloride solution in water was added to the IEM solution. The sample was then allowed to equilibrate under constant stirring for 15 minutes. After the equilibration step, the sample was titrated with 1N sodium hydroxide solution. The volume of 1N sodium hydroxide solution that was needed to neutralize the sample solution to a pH value of 7 was recorded. The EW of the IEM ($EW_{IEM}$) was calculated as:

$$EW_{IEM} = \frac{\left\{\begin{matrix}\text{Mass of}\\ IEM\text{ solution}\end{matrix}\right\} \times \left\{\begin{matrix}\text{wt\% solids of}\\ IEM\text{ solution}\end{matrix}\right\}}{\left\{\begin{matrix}\text{Volume of}\\ \text{NaOH solution}\end{matrix}\right\} \times \left\{\begin{matrix}\text{Normality of}\\ \text{NaOH solution}\end{matrix}\right\}} = \left[\frac{\text{g}}{\text{mole } eq.}\right]$$

When multiple IEMs were combined to make a composite membrane, the average EW of the IEMs in the composite membrane was calculated using the following formula:

$$EW_{IEM\_average} = \left[\frac{\left\{\begin{matrix}\text{Mass fraction}\\ \text{of } IEM\ 1\end{matrix}\right\}}{\{EW_{IEM,1}\}} + \frac{\left\{\begin{matrix}\text{Mass fraction}\\ \text{of } IEM\ 2\end{matrix}\right\}}{\{EW_{IEM,2}\}} + \ldots \cdot \frac{\left\{\begin{matrix}\text{Mass fraction}\\ \text{of } IEM\ N\end{matrix}\right\}}{\{EW_{IEM,N}\}}\right]^{-1} = \left[\frac{g}{\text{mole } eq}\right],$$

where the mass fraction of each IEM is with respect to the total content of all IEMs. This formula was used both for composite membranes containing ionomer blends and for composite membranes containing ionomer layers.

Equivalent Volume (EV) of Ion Exchange Material

As used herein, the Equivalent Volume of the IEM refers to the EV if that IEM were pure and in its proton form at 0% RH, with negligible impurities. The EV was calculated according to the following formula:

$$EV_{IEM} = \frac{\left\{\begin{matrix}\text{Equivalent Weight}\\ \text{of } IEM\end{matrix}\right\}}{\left\{\begin{matrix}\text{Volumetric density}\\ \text{of } IEM \text{ at } 0\%\ RH\end{matrix}\right\}} = \left[\frac{cc}{\text{mole } eq.}\right]$$

The Equivalent Weight of each IEM was determined in accordance with the procedure described above. The IEMs used in these application were perfluorosulfonic acid ionomer resins the volumetric density of perfluorosulfonic acid ionomer resin was taken to be 1.9 g/cc at 0% RH.

Thickness of Composite Membrane

The composite membranes were equilibrated in the room in which the thickness was measured for at least 1 hour prior to measurement. Composite membranes were left attached to the substrates on which the composite membranes were coated. For each sample, the composite membrane on its coating substrate was placed on a smooth, flat, level marble slab. A thickness gauge (obtained from Heidenhain Corporation, USA) was brought into contact with the composite membrane and the height reading of the gauge was recorded in six different spots arranged in grid pattern on the membrane. Then, the sample was removed from the substrate, the gauge was brought into contact with the substrate, and the height reading was recorded again in the same six spots. The thickness of the composite membrane at a given relative humidity (RH) in the room was calculated as a difference between height readings of the gauge with and without the composite membrane being present. The local RH was measured using an RH probe (obtained from Fluke Corporation). The thickness at 0% RH was calculated using the following general formula:

$$\text{Composite membrane thickness at } 0\%\ RH == \left(\frac{\text{Composite membrane thickness at room} RH - \frac{M/A_{microporous\ polymer\ structure}}{\text{Density}_{microporous\ polymer\ structure}}}{1 + \frac{\lambda_{room\ RH}}{EW_{ionomer\_average}} * \frac{\text{Molecular weight}_{water}}{\text{Density}_{water}} * \text{Density}_{ionomer}}\right) ** \left(1 + \frac{\lambda_{RH=0\%}}{EW_{ionomer_{average}}} * \frac{\text{Molecular weight}_{water}}{\text{Density}_{water}} * \text{Density}_{ionomer}\right) + \frac{M/A_{microporous\ polymer\ structure}}{\text{Density}_{microporous\ polymer\ structure}} == [\text{micron}]$$

where the parameter/corresponds to the water uptake of the Ion Exchange Material in terms of moles of water per mole of acid group at a specified RH. For PFSA ionomer, the values for λ at any RH in the range from 0 to 100% in gas phase were calculated according the following formula:

$$\lambda = 80.239 \times RH^6 - 38.717 \times RH^5 - 164.451 \times RH^4 + 208.509 \times RH^3 - 91.052 \times RH^2 + 21.740 \times RH^1 + 0.084$$

Microporous Polymer Matrix (MPM) Volume Content of Composite Membrane

The volume % of the Microporous Polymer Matrix in each Composite Membrane was calculated according to the following formula:

$$\%\ Vol_{MPM} = \frac{\left(\frac{M/A_{microporous\ polymer\ structure}}{\text{Matrix skeletal density}_{microporous\ polymer\ structure}}\right)}{\text{Composite Membrane thickness at } 0\%\ RH} = [\%]$$

The Microporous Polymer Matrices used in these examples were ePTFE and track etched porous polycarbonate. The matrix skeletal density of ePTFE was taken to be 2.25 g/cc and of track etched porous polycarbonate was taken to be 1.20 g/cc.

Acid Content of Composite Membrane

Acid content of composite membranes was calculated according to the following formula:

$$\text{Acid Content} = \frac{\left(\text{Composite Membrane thickness at } 0\%\ RH - \frac{M/A_{microporous\ polymer\ structure}}{\text{Matrix Density}_{microporous\ polymer\ structure}}\right) \times \text{Density}_{ionomer}}{EW_{ionomer}} \times \frac{1}{\text{Composite Membrane thickness at } 0\%\text{RH}} = \left[\frac{\text{mole } eq}{cc}\right]$$

Ball Burst Test of Composite Microporous Layer

The mechanical strength of a composite membrane prepared in accordance with the present invention was measured by subjecting a sample to a load pressure.

A sample was fixed taut in a frame with a 45 mm diameter opening. The sample in the frame was placed into an universal testing machine AG-I of Shimadzu Corporation, Japan with an environmentally controlled chamber with the temperature and relative humidity inside of the chamber being 23° C. and 80%, respectively. A steel ball with a diameter of 6.35 mm, supported on a post, was pressed into the suspended membrane at a constant rate of 100 mm/min. The maximum load generated by the system at the sample's break was recorded and that value is called the ball burst strength.

Average Puncture Pressure Failure Test

A sample was placed between two porous carbon electrodes (Sigracet 39AA Carbon Paper) and loaded on an Instron model 5542, with electrically isolated 14 mm diameter gold-plated cylindrical platens. The sample and electrodes area were oversized compared to the platens and extended beyond the platen to eliminate edge effects on puncture. The sample area was oversized compared to the electrodes area to prevent electrodes from touching and creating an electronic short that does not path through the sample. Electrical resistance across the membrane is measured by a Keithley 580 Micro-Ohmmeter connected to the top and bottom platens. The top platen was lowered at ambient conditions at a rate of 1 mm/min while compressive mechanical load is applied to the samples and electrical resistance measured across the sample were constantly recorded until 444.8 N (100 lbf) was applied; where a higher compression pressure may be accessed with alternative instrumentation or smaller platen active area. Membrane puncture is defined as the pressure when electrical resistance drops below 18,000 ohms, representing physical contact of the electrodes or electrode fibers through the sample. Five replicates were tested for each sample and the average of the five runs is reported as the average puncture pressure. Puncture pressure is dependent on electrode material and may significantly increase or decrease if alternative electrode materials are used.

$$\text{Puncture Pressure} = \frac{\{\text{Force at Failure}\}}{\{\text{Platen Surface Area}\}} = [\text{psi}]$$

EXAMPLES

The composite membranes of the present disclosure may be better understood by referring to the following non-limiting examples.

To determine characteristics such as acid content, volume, and puncture resistance of the composite membrane and properties of the test procedures and measurement protocols were performed as described above. Table 1 illustrates the properties of composite membranes according to embodiments of the invention as well as comparative examples. Table 2 illustrates properties of the microporous polymer structure used in various test procedures in five series of examples in accordance with some aspects of the invention as well as comparative examples.

Ion Exchange Materials Manufactured in Accordance with Aspects of the Present Disclosure for all Examples All ion exchange materials used in the following examples are perfluorosulfonic acid (PFSA) based ionomers with the specified equivalent weight (EW) in Table 1. All ionomers prior to manufacturing of composite membranes were in the form of solutions based on water and ethanol mixtures as solvent with water content in solvent phase being less than 50%.

A commonly known ion exchange material was used to produce a composite membrane of the present disclosure. A preferable example is a solution obtained by dispersing or dissolving a solid PFSA ionomer represented by the following general formula (wherein a:b=1:1 to 9:1 and n=0, 1, or 2) in a solvent.

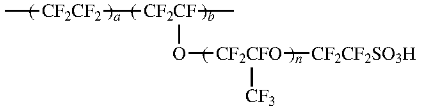

In some aspects, the solvent is selected from the group consisting of: water; alcohols such as methanol, ethanol, propanol, n-butylalcohol, isobutylalcohol, sec-butylalcohol, and tert-butylalcohol; pentanol and its isomers; hexanol and its isomers; hydrocarbon solvents such as n-hexane; ether-based solvents such as tetrahydrofuran and dioxane; sulfoxide-based solvents such as dimethylsulfoxide and diethylsulfoxide; formamide-based solvents such as N,N-dimethylformamide and N,N-diethylformamide; acetamide-based solvents such as N,N-dimethylacetamide and N,N-diethylacetamide; pyrrolidone-based solvents such as N-methyl-2-pyrrolidone and N-vinyl-2-pyrrolidone; 1,1,2,2-tetrachloroethane; 1,1,1,2-tetrachloroethane; 1,1,1-trichloroethane; 1,2-dichloroethane; trichloroethylene; tetrachloroethylene; dichloromethane; and chloroform. In the present disclosure, the solvent is optionally selected from the group consisting of water, methanol, ethanol, propanol. Water and the above solvents may be used alone or in combinations of two or more.

Series 1

Prior Art Example 1

Prior art example 1 was prepared according to the following procedure: A first ePTFE membrane 1 with mass per area of 2.8 g/$m^2$, a thickness of 9.6 μm, an apparent density of 0.29 g/cc and a bubble point of 34.4 psi was used as microporous polymer structure of reinforcing layers. A PSFA solution as IEM with EW=810 g/mole eq $SO_3^-$ (obtained from Shanghai Gore 3F Fluoromaterials Co., LTD., China), solution composition of 17.3% water, 71.5% ethanol, 11.2% solids, was coated onto the top side of a backer layer as first laydown using a drawdown bar with theoretical wet coating thickness of 3 mil (76.2 μm). While the coating was still wet, a first reinforcing layer of ePTFE membrane 1 previously restrained on metal frame was laminated to the coating, whereupon the IEM solution imbibed into the pores. This composite material was subsequently dried in a convection oven with air inside at a temperature of 165° C. On the second laydown, same solution of IEM was coated onto the top surface of the first ePTFE membrane 1 using a drawdown bar with theoretical wet coating thickness of 4 mil (101.6 μm). While the coating was still wet, a second reinforcing layer of ePTFE membrane 1 previously restrained on metal frame was laminated to the coating, whereupon the IEM solution imbibed into the pores. The composite material was subsequently dried in a convection oven with air inside at a temperature of 165° C. On the third laydown, a PSFA solution as IEM with EW=810 g/mole eq $SO_3^-$ (obtained from Shanghai Gore 3F Fluoromaterials Co., LTD., China), solution composition of 6.2% water, 89.8% ethanol, 4.0% solids, was coated onto the top surface of the second reinforcing layer using a drawdown bar with theoretical wet coating thickness of 3 mil (76.2 μm). The composite membrane was then dried again at 165° C. The multilayer composite membrane was fully occlusive and had a layer of IEM on each side and in between of the two fully occluded microporous polymer layers. The resulting composite membrane had thickness at 0% RH of 8.66 micron.

Comparative Example 1.1

Comparative example 1.1 was made according to the following procedure: An ePTFE membrane 2 with mass per area of 6 g/$m^2$, a thickness of 19.7 μm, an apparent density of 0.29 g/cc and a bubble point of 34.8 psi was hand strained to eliminate wrinkles and restrained in this state by a metal frame. Next, a first laydown of IEM of PSFA solution with EW=810 g/mole eq $SO_3^-$ (obtained from Asahi Glass Co Ltd.), solution composition of 32.2% water, 49.6% ethanol, 18.2% solids, was coated onto the top side of a polymer substrate (backer material). The polymer substrate (obtained from DAICEL VALUE COATING LTD., Japan) comprises PET and a protective layer of cyclic olefin copolymer (COC), and was oriented with the COC side on top. The IEM (PFSA solution) coating was accomplished using a meyer bar with theoretical wet coating thickness of 3 mils (76.2 μm). While the coating was still wet, the ePTFE membrane 2 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane) became fully imbibed with the IEM. The IEM also formed a layer between the bottom surface of the microporous polymer substrate and the polymer substrate. On the second laydown, a solution of IEM with the same EW and a composition of 18.4% water, 73.3% ethanol, 8.3% solids was coated onto the top surface of the ePTFE membrane 2 (the surface opposite the polymer substrate) using a drawdown bar with theoretical wet coating thickness of 2.5 mil (63.5 μm). The composite membrane was then dried again at 165° C., at which point it was largely transparent, indicating a full impregnation of the microporous polymer structure. The composite membrane was fully occlusive and had a layer of IEM on each side of the microporous polymer structure. The resulting composite membrane had thickness at 0% RH of 8.6 μm.

Comparative Example 1.2

Comparative example 1.2 was prepared according to the same procedure as described for comparative example 1.1 except that different materials were used. An ePTFE membrane 3 with mass per area of 3.9 g/m$^2$, a thickness of 11.7 μm, an apparent density of 0.34 g/cc and a bubble point of 97.5 psi was used as microporous polymer structure. A PSFA solution as IEM with EW=710 g/mole eq $SO_3^-$ (obtained from Asahi Glass Co Ltd.), solution composition of 26.4% water, 61.6% ethanol, 12% solids, was coated onto the top side of a polymer substrate (backer material) as first laydown using a drawdown bar with theoretical wet coating thickness of 4 mil (101.6 μm). While the coating was still wet, the ePTFE membrane 3 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane) became fully imbibed with the IEM. The IEM also formed a layer between the bottom surface of the microporous polymer substrate and the polymer substrate. On the second laydown, solution of the same IEM with composition of 41% water, 53% ethanol, 6% solids was coated onto the top surface of the ePTFE membrane 3 (the surface opposite the polymer substrate) using a drawdown bar with theoretical wet coating thickness of 2 mil (50.8 μm). The composite material was then dried again at 165° C., at which point it was largely transparent, indicating a full impregnation of the microporous polymer structure. The composite membrane was fully occlusive and had a layer of IEM on each side of the microporous polymer substrate. The resulting composite membrane had thickness at 0% RH of 7.8 μm.

Series 2

Prior Art Example 2

Prior art example 2 was prepared according to the following procedure: First, two microporous polymer structures, a first ePTFE membrane 4 with mass per area of 3.1 g/m$^2$, a thickness of 13.3 μm, an apparent density of 0.33 g/cc and a bubble point of 55.5 psi and a second ePTFE membrane 6 with mass per area of 3.0 g/m$^2$, a thickness of 15.2 μm, an apparent density of 0.20 g/cc and a bubble point of 36.6 psi were strained to eliminate wrinkles and restrained one on top of another touching on a metal frame. Next, a first laydown of solution of IEM with EW=810 g/mole eq $SO_3$-(obtained from Shanghai Gore 3F Fluoromatenals Co., LTD., China), solution composition of 17.3% water, 71.5% ethanol, 11.2% solids, was coated onto the top side of a polymer substrate (backer layer). The polymer substrate (obtained from DAICEL VALUE COATING LTD., Japan) comprised PET and a protective layer of cyclic olephin copolymer (COC), and was oriented with the COC side on top. The coating the first laydown was accomplished using a drawdown bar with theoretical wet coating thickness of 5 mils (127 μm). While the coating was still wet, the ePTFE membranes 4 and 6 previously restrained on metal frame were both laminated to the coating, whereupon the IEM solution imbibed into the pores of the microporous polymer structures. This multilayer composite material was subsequently dried in a convection oven with air inside at a temperature of 165° C. Upon drying, the microporous polymer matrices became fully imbibed with the IEM. The IEM also formed a layer between the bottom surface of the microporous polymer matrix and the polymer substrate. On the second laydown, a solution of IEM with EW=810 g/mole eq $SO_3^-$ (obtained from Shanghai Gore 3F Fluoromaterials Co., LTD., China), solution composition of 4% water, 95.0% ethanol, 1% solids, was coated onto the top surface of the composite material (the surface opposite the polymer substrate) using a drawdown bar with theoretical wet coating thickness of 0.5 mil (12.7 μm). The multilayer composite material was then dried again at 165° C., at which point it was largely transparent, indicating a full impregnation of the microporous polymer matrix. The multilayer composite material was comprised of a multilayer composite membrane bonded to a substrate. The multilayer composite membrane was fully occlusive and had a layer of IEM on each side of the microporous polymer structures that were touching. The resulting multilayer composite membrane had thickness at 0% RH of 7.1 micron.

Comparative Example 2.1

Comparative example 2.1 was prepared according to the same procedure as described for comparative example 1.1 except that different materials were used. An ePTFE membrane 5 with mass per area of 4.5 g/m$^2$, a thickness of 23 μm, an apparent density of 0.2 g/cc and a bubble point of 55.8 psi was used as microporous polymer structure. A PSFA solution as IEM with EW=810 g/mole eq $SO_3^-$ (obtained from Asahi Glass Co Ltd.), solution composition of 33% water, 48.8% ethanol, 18.2% solids, was coated onto the top side of a polymer substrate (backer layer) as first laydown using a drawdown bar with theoretical wet coating thickness of 3 mil (76.2 μm). While the coating was still wet, the ePTFE membrane 5 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane 5) became fully imbibed with the IEM. The IEM also formed a layer between the bottom surface of the microporous polymer substrate and the polymer substrate. On the second laydown, solution of the same IEM with composition of 35% water, 56.7% ethanol, 8.3% solids was coated onto the top surface of the membrane 5 (the surface opposite the polymer substrate) using a drawdown bar with theoretical wet coating thickness of 3 mil (76.2 μm). The composite material was then dried again at 165° C., at which point it was largely transparent, indicating a full impregnation of the microporous polymer structure. The composite membrane was fully occlusive and had a layer of IEM on each side of the microporous polymer substrate. The resulting composite membrane had thickness at 0% RH of 8.8 μm.

Series 3

Comparative Example 3.1

Comparative example 3.1 was prepared according to the same procedure as described for comparative example 1.1 except that different materials were used. An ePTFE membrane 7 with mass per area of 10.4 $g/m^2$, a thickness of 62.2 μm, an apparent density of 0.16 g/cc and a bubble point of 56.2 psi was used as microporous polymer structure. A PSFA solution as IEM with EW=710 g/mole eq $SO_3^-$ (obtained from Asahi Glass Co Ltd.), solution composition of 32% water, 49.8% ethanol, 18.2% solids, was coated onto the top side of a polymer substrate (backer layer) on first laydown using a drawdown bar with theoretical wet coating thickness of 9 mil (228.6 μm). While the coating was still wet, the ePTFE membrane 7 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane 7) became fully imbibed with the IEM. The IEM also formed a layer between the bottom surface of the microporous polymer substrate and the polymer substrate. On the second laydown, solution of the same IEM with composition of 41% water, 53% ethanol, 6% solids was coated onto the top surface of the ePTFE membrane 7 (the surface opposite the polymer substrate) using a drawdown bar with theoretical wet coating thickness of 3 mil (76.2 μm). The composite material was then dried again at 165° C., at which point it was largely transparent, indicating a full impregnation of the microporous polymer structure. The composite membrane was fully occlusive and had a layer of IEM on each side of the microporous polymer substrate. The resulting composite membrane had thickness at 0% RH of 15.3 μm.

Inventive Example 3.2

Inventive example 3.2 was prepared according to the following procedure: a first ePTFE membrane 3 with mass per area of 3.9 $g/m^2$, a thickness of 11.7 μm, an apparent density of 0.34 g/cc and a bubble point of 97.5 psi was used as microporous polymer structure of a reinforcing layer. A PSFA solution as IEM with EW=710 g/mole eq $SO_3$ (obtained from Asahi Glass Co Ltd.), solution composition of 35% water, 55.1% ethanol, 9.9% solids, was coated onto the top side of a polymer substrate (backer layer) as first laydown using a drawdown bar with theoretical wet coating thickness of 5 mil (127 μm). While the coating was still wet, the first ePTFE membrane 3 restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane 3) became fully imbibed with the IEM. A second laydown of the same solution of IEM was coated onto the top surface of the first membrane 3 (the surface opposite the polymer substrate) using a drawdown bar with theoretical wet coating thickness of 5 mil (127 μm). While the coating was still wet, a second ePTFE membrane 3 previously restrained on metal frame was laminated to the coating, whereupon the IEM solution imbibed into the pores. This composite material was subsequently dried in a convection oven with air inside at a temperature of 165° C. A third laydown of a PSFA solution with same IEM EW, solution composition of 38.0% water, 57.7% ethanol, 4.3% solids, was coated onto the top surface of the second membrane 3 using a drawdown bar with theoretical wet coating thickness of 3 mil (76.2 μm). This composite material was subsequently dried in a convection oven with air inside at a temperature of 165° C. The multilayer composite membrane was fully occlusive and had a layer of IEM on each side and in between of the two fully occluded microporous polymer layers of the membrane 3 with a separation distance d of about 2 μm. The resulting composite membrane had thickness at 0% RH of 14.5 micron.

Inventive Example 3.3

Inventive example 3.3 was prepared according to the following procedure: a ePTFE membrane 5 with mass per area of 4.5 $g/m^2$, a thickness of 23 μm, an apparent density of 0.20 g/cc and a bubble point of 55.8 psi was used as microporous polymer structure of the reinforcing layers. A PSFA solution as IEM with EW=710 g/mole eq $SO_3^-$ (obtained from Asahi Glass Co Ltd.), solution composition of 33% water, 52.2% ethanol, 14.8% solids, was coated onto the top side of a polymer substrate (backer layer) as first laydown using a drawdown bar with theoretical wet coating thickness of 3 mil (76.2 μm). While the coating was still wet, a first ePTFE membrane 5 restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane) became fully imbibed with the IEM. A second laydown of the same solution of IEM was coated onto the top surface of the first membrane 5 composite material (the surface opposite the polymer substrate) using a drawdown bar with theoretical wet coating thickness of 6 mil (152.4 μm). While the coating was still wet, a second ePTFE membrane 5 previously restrained on metal frame was laminated to the coating, whereupon the IEM solution imbibed into the pores. This composite material was subsequently dried in a convection oven with air inside at a temperature of 165° C. A third laydown of a PSFA solution with same IEM and EW, solution composition of 10.0% water, 89.0% ethanol, 1.0% solids, was coated onto the top surface of the second membrane 5 using a drawdown bar with theoretical wet coating thickness of 1.5 mil (38.1 μm). This composite material was subsequently dried in a convection oven with air inside at a temperature of 165° C. The multilayer composite membrane was fully occlusive and had a layer of IEM on each side and in between of the two fully occluded microporous polymer layers of membrane 5 with a separation distance d of about 2 μm. The resulting composite membrane had thickness at 0% RH of 14.4 μm.

Series 4

Comparative Example 4.1

Comparative example 4.1 was prepared according to the same procedure as described for comparative example 1.1 except that different materials were used. An ePTFE membrane 7 with mass per area of 10.4 g/$m^2$, a thickness of 62.2 μm, an apparent density of 0.16 g/cc and a bubble point of 56.2 psi was used as microporous polymer structure. A PSFA solution as IEM with EW=710 g/mole eq $SO_3^-$ (obtained from Asahi Glass Co Ltd.), solution composition of 32% water, 49.8% ethanol, 18.2% solids, was coated onto the top side of a polymer substrate (backer layer) on first laydown using a drawdown bar with theoretical wet coating thickness of 9 mil (228.6 μm). The membrane was subsequently dried in a convection oven with air inside at a temperature of 165° C. On the second laydown, solution of the same IEM with composition of 41% water, 53% ethanol, 6% solids was coated onto the top surface of membrane 7 using a drawdown bar with theoretical wet coating thickness of 3 mil (76.2 μm). The membrane was again dried in a convection oven with air inside at a temperature of 165° C. The composite membrane was fully occlusive and had a layer of IEM on each side of the microporous polymer substrate. The resulting composite membrane had thickness at 0% RH of 15.3 μm.

Inventive Example 4.2

Inventive example 4.2 was prepared according to the following procedure: First, two microporous polymer structures of ePTFE membrane 5 as reinforcing layers with mass per area of 4.5 g/$m^2$, a thickness of 23 μm, an apparent density of 0.20 g/cc and a bubble point of 55.8 psi were strained to eliminate wrinkles and restrained one on top of another touching on a metal frame. Next, a first laydown of solution of IEM with EW=710 g/mole eq $SO_3^-$ (obtained from Asahi Glass Co Ltd.), solution composition of 33% water, 52.2% ethanol, 14.8% solids, was coated onto the top side of a polymer substrate (backer layer). The polymer substrate (obtained from DAICEL VALUE COATING LTD., Japan) comprised PET and a protective layer of cyclic olephin copolymer (COC), and was oriented with the COC side on top. The coating was accomplished using a drawdown bar with theoretical wet coating thickness of 7 mils (177.8 μm). While the coating was still wet, the two ePTFE membranes 5 previously restrained on metal frame were laminated to the coating, whereupon the IEM solution imbibed into the pores. This multilayer composite material was subsequently dried in a convection oven with air inside at a temperature of 165° C. Upon drying, the microporous polymer matrices became fully imbibed with the IEM. The IEM also formed a layer between the bottom surface of the microporous polymer structures and the polymer substrate. On the second laydown, a solution of IEM with EW=710 g/mole eq $SO_3^-$ (obtained from Asahi Glass Co Ltd.), solution composition of 33% water, 52.2% ethanol, 14.8% solids, was coated onto the top surface of the ePTFE membranes 5 (the surface opposite the polymer substrate) using a drawdown bar with theoretical wet coating thickness of 1.5 mil (38.1 μm). The multilayer composite material was then dried again at 165° C., at which point it was largely transparent, indicating a full impregnation of the microporous polymer matrix. The multilayer composite membrane was fully occlusive and had a layer of IEM on each side of the microporous polymer matrices that were touching. The resulting multilayer composite membrane had thickness at 0% RH of 14.4 μm.

Inventive Example 4.3

Inventive example 4.3 was prepared according to the same procedure as inventive example 3.3, described previously herein.

Inventive Example 4.4

Inventive example 4.4 was prepared according to the same procedure as described for inventive example 3.3 except that different materials were used. A ePTFE membrane 5 with mass per area of 4.5 g/$m^2$, a thickness of 23 μm, an apparent density of 0.20 g/cc and a bubble point of 55.8 psi was used as microporous polymer structure of the reinforcing layers. A PSFA solution as IEM with EW=710 g/mole eq $SO_3^-$ (obtained from Asahi Glass Co Ltd.), solution composition of 29.8% water, 56.8% ethanol, 13.4% solids, was coated onto the top side of a polymer sheet substrate (backer layer) with a first laydown using a drawdown bar with theoretical wet coating thickness of 4 mil (101.6 μm). While the coating was still wet, a first ePTFE membrane 5 previously restrained on metal frame were laminated to the coating, whereupon the IEM solution imbibed into the pores. This composite material was subsequently dried in a convection oven with air inside at a temperature of 165° C. Upon drying, the microporous polymer structures became fully imbibed with the IEM. The IEM also formed a layer between the bottom surface of the microporous polymer structure and the polymer substrate. On the second laydown, solution of the same IEM with composition of 29.8% water, 56.8% ethanol, 13.4% solids was coated onto the top surface of first ePTFE membrane 5 using a drawdown bar with theoretical wet coating thickness of 5 mil (127 μm). A second ePTFE membrane 5 previously restrained on metal frame was laminated to the coating, whereupon the IEM solution imbibed into the pores. This multilayer composite material was subsequently dried in a convection oven with air inside at a temperature of 165° C. On the third laydown, a solution of the same IEM with composition of 35% water, 59% ethanol, 6% solids, was coated using a drawdown bar with theoretical wet coating thickness of 2 mil (50.8 μm). This composite material was subsequently dried in a convection oven with air inside at a temperature of 165° C. The multilayer composite membrane was fully occlusive and had a layer of IEM on each side and in between of the two fully occluded microporous polymer layers that have a separation distance d of about 4 μm. The resulting composite membrane had thickness at 0% RH of 14.4 μm.

Series 5

Comparative Example 5.1

Comparative example 5.1 was prepared according to the same procedure as described for comparative example 1.1 except that different materials were used. An ePTFE membrane 8 with mass per area of 18 g/$m^2$, a thickness of 33.4 μm, an apparent density of 0.53 g/cc and a bubble point of 23.7 psi was used as microporous polymer structure. A PSFA solution as IEM with EW=810 g/mole eq $SO_3^-$ (obtained from Asahi Glass Co Ltd.), solution composition of 32.2% water, 49.6% ethanol, 18.2% solids, was coated as first laydown using a drawdown bar with theoretical wet coating thickness of 9 mil (228.6 μm). While the coating was still wet, a first ePTFE membrane 8 previously restrained on metal frame were laminated to the coating, whereupon the IEM solution imbibed into the pores. This composite material was subsequently dried in a convection oven with air inside at a temperature of 165° C. On the second laydown, solution of the same IEM with composition of 15.1% water, 18.4% ethanol, 4.2% solids was coated onto the top surface of ePTFE membrane 8 using a drawdown bar with theoretical wet coating thickness of 1.5 mil (38.1 μm). This composite material was again dried in a convection oven with air inside at a temperature of 165° C. The composite membrane was fully occlusive and had a layer of IEM on each side of the microporous polymer substrate. The resulting composite membrane had thickness at 0% RH of 23.8 μm.

Inventive Example 5.2

Inventive example 5.2 was prepared according to the same procedure as described for inventive example 4.2 except that different materials were used. A first ePTFE membrane 5 with mass per area of 4.5 $g/m^2$, a thickness of 23 μm, an apparent density of 0.20 g/cc and a bubble point of 55.8 psi and a second ePTFE membrane 7 with mass per area of 10.4 $g/m^2$, a thickness of 62.2 μm, an apparent density of 0.16 g/cc and a bubble point of 56.2 psi were used as the microporous polymer structures for two reinforcing layers. A PSFA solution as IEM with EW=810 g/mole eq $SO_3^-$ (obtained from Asahi Glass Co Ltd.), solution composition of 32.2% water, 49.6% ethanol, 18.2% solids, was coated as first laydown using a drawdown bar with theoretical wet coating thickness of 9 mil (228.6 μm). While the coating was still wet, a first ePTFE membrane 5 and second ePTFE membrane 7 previously restrained on metal frame were laminated to the coating, whereupon the IEM solution imbibed into the pores of both ePTFE membranes. This composite material was subsequently dried in a convection oven with air inside at a temperature of 165° C. On the second laydown, IEM solution of the same EW with composition of 18.4% water, 73.3% ethanol, 8.3% solids was coated onto the top surface of the two ePTFE membranes 5 and 7 using a drawdown bar with theoretical wet coating thickness of 4 mil (101.6 μm). This composite material was again dried in a convection oven with air inside at a temperature of 165° C. The multilayer composite membrane was fully occlusive and had a layer of IEM on each side with the two fully occluded microporous polymer layers were in contact with each other. The resulting composite membrane had thickness at 0% RH of 24.1 μm.

Inventive Example 5.3

Inventive example 5.3 was prepared according to the following procedure: First, three microporous polymer structures of ePTFE membrane 5 with mass per area of 4.5 $g/m^2$, a thickness of 23 μm, an apparent density of 0.20 g/cc and a bubble point of 55.8 psi and ePTFE were strained to eliminate wrinkles and restrained one on top of another touching on a metal frame. Next, a first laydown of solution of IEM with EW=810 g/mole eq $SO_3^-$ (obtained from Asahi Glass Co Ltd.), solution composition of 32.2% water, 49.6% ethanol, 18.2% solids, was coated onto the top side of a polymer substrate (backer layer). The substrate (obtained from DAICEL VALUE COATING LTD., Japan) comprised PET and a protective layer of cyclic olephin copolymer (COC), and was oriented with the COC side on top. The coating was accomplished using a drawdown bar with theoretical wet coating thickness of 9 mils (228.6 μm). While the coating was still wet, the three ePTFE membranes 5 previously restrained on a metal frame were laminated to the coating, whereupon the IEM solution imbibed into the pores. This multilayer composite material was subsequently dried in a convection oven with air inside at a temperature of 165° C. Upon drying, the microporous polymer matrices became fully imbibed with the IEM. The IEM also formed a layer between the bottom surface of the microporous polymer matrix and the polymer substrate. On the second laydown, a solution of IEM with EW=710 g/mole eq $SO_3^-$ (obtained from Asahi Glass Co Ltd.), solution composition of 18.4% water, 73.3% ethanol, 8.3% solids, was coated onto the top surface of the composite material (the surface opposite the polymer substrate) using a drawdown bar with theoretical wet coating thickness of 2 mil (50.8 μm). The multilayer composite material was then dried again at 165° C., at which point it was largely transparent, indicating a full impregnation of the microporous polymer matrix. The multilayer composite membrane was fully occlusive and had a layer of IEM on each side of the microporous polymer matrices that were touching. The resulting multilayer composite membrane had thickness at 0% RH of 24.2 μm.

Inventive Example 5.4

Inventive example 5.4 was prepared according to the same procedure as described for inventive example 4.2 except that different materials were used. A first ePTFE membrane 9 with mass per area of 9.9 $g/m^2$, a thickness of 23 μm, an apparent density of 0.43 g/cc and a bubble point of 130 psi and a second ePTFE membrane 9 of the same material were used as the microporous polymer structures. A PSFA solution as IEM with EW=810 g/mole eq $SO_3^-$ (obtained from Asahi Glass Co Ltd.), solution composition of 26.0% water, 55.0% ethanol, 19% solids, was coated onto the top side of a polymer substrate (backer layer) as first laydown using a drawdown bar with theoretical wet coating thickness of 9 mil (228.6 μm). While the coating was still wet, a first ePTFE membrane 9 and second ePTFE membrane 9 previously restrained on metal frame were laminated to the coating, whereupon the IEM solution imbibed into the pores of both ePTFE membranes. This composite material was subsequently dried in a convection oven with air inside at a temperature of 165° C. On the second laydown, IEM solution of the same EW with composition of 18.4% water, 73.3% ethanol, 8.3% solids was coated onto the top surface of the composite material using a drawdown bar with theoretical wet coating thickness of 2 mil (50.8 μm). This multilayer composite material was subsequently dried in a convection oven with air inside at a temperature of 165° C. The resulting multilayer composite membrane was fully occlusive and had a layer of IEM on each side with the two fully occluded microporous polymer layers were in contact with each other. The resulting composite membrane had thickness at 0% RH of 24.0 μm.

Series 6

Comparative Example 6.1

Comparative example 6.1 was prepared according to the same procedure as described for comparative example 1.1 except that different materials were used. An ePTFE membrane 10 with mass per area of 29.5 $g/m^2$, a thickness of 137 μm, an apparent density of 0.22 g/cc and a bubble point of 43.5 psi was used as microporous polymer structure. A PSFA solution as IEM with EW=1100 g/mole eq $SO_3^-$ (obtained from E. I. du Pont de Nemours and Company), solution composition of 38% water, 41.8% ethanol, 20.2% solids, was coated onto the top side of a polymer substrate (backer layer) as first laydown using a drawdown bar with theoretical wet coating thickness of 10 mil (254 μm). While the coating was still wet, the ePTFE membrane 10 previously restrained on a metal frame were laminated to the coating, whereupon the IEM solution imbibed into the pores. The composite material was subsequently dried in a convection oven with air inside at a temperature of 165° C. On the second laydown, solution of the same IEM with composition of 26% water, 64.2% ethanol, 9.8% solids was coated onto the top surface of the composite material using a drawdown bar with theoretical wet coating thickness of 3 mil (76.2 μm). This composite material was subsequently dried in a convection oven with air inside at a temperature of 165° C. The resulting composite membrane was fully occlusive and had a layer of IEM on each side of the microporous polymer substrate. The resulting composite membrane had thickness at 0% RH of 38.8 μm.

Inventive Example 6.2

Inventive example 6.2 was prepared according to the following procedure: a ePTFE membrane 7 with mass per area of 10.4 $g/m^2$, a thickness of 62.2 μm, an apparent density of 0.16 g/cc and a bubble point of 56.2 psi was used as microporous polymer structure of the reinforcing layers. A PSFA solution as IEM with EW=1100 g/mole eq $SO_3^-$ (obtained from E. I. du Pont de Nemours and Company), solution composition of 24.4% water, 56.6% ethanol, 19.0% solids, was coated onto the top side of a polymer substrate (backer layer). The polymer substrate (obtained from DAICEL VALUE COATING LTD., Japan) comprised PET and a protective layer of cyclic olephin copolymer (COC), and was oriented with the COC side on top. The coating was accomplished using a drawdown bar with theoretical wet coating thickness of 5 mils (127 μm). While the coating was still wet, a first ePTFE membrane 7 restrained on metal frame was laminated to the coating, whereupon the IEM solution imbibed into the pores. This composite material was subsequently dried in a convection oven with air inside at a temperature of 125° C. Upon drying, the microporous polymer structure (ePTFE membrane 7) became fully imbibed with the IEM. A second laydown of the same solution of IEM was coated onto the top surface of the composite material (the surface opposite the polymer substrate) using a drawdown bar with theoretical wet coating thickness of 5 mil (127 μm). While the coating was still wet, a second ePTFE membrane 7 previously restrained on metal frame was laminated to the coating, whereupon the IEM solution imbibed into the pores. This composite material was subsequently dried in a convection oven with air inside at a temperature of 125° C. A third laydown of the same solution of IEM was coated onto the top surface of the composite material using a drawdown bar with theoretical wet coating thickness of 5 mil (127 μm). While the coating was still wet, a third ePTFE membrane 7 previously restrained on metal frame was laminated to the coating, whereupon the IEM solution imbibed into the pores. This composite material was subsequently dried in a convection oven with air inside at a temperature of 125° C. A fourth laydown of a PSFA solution with same IEM and EW, solution composition of 20.0% water, 76.0% ethanol, 4.0% solids, was coated onto the top surface of the composite material using a drawdown bar with theoretical wet coating thickness of 5 mil (127 μm). This multilayer composite material was subsequently dried in a convection oven with air inside at a temperature of 165° C. The multilayer composite membrane was fully occlusive and had a layer of IEM on each side and in between each of the three fully occluded microporous polymer layers that have a separation distance d of about 1 μm. The resulting composite membrane had thickness at 0% RH of 38.6 μm.

Figure 10:
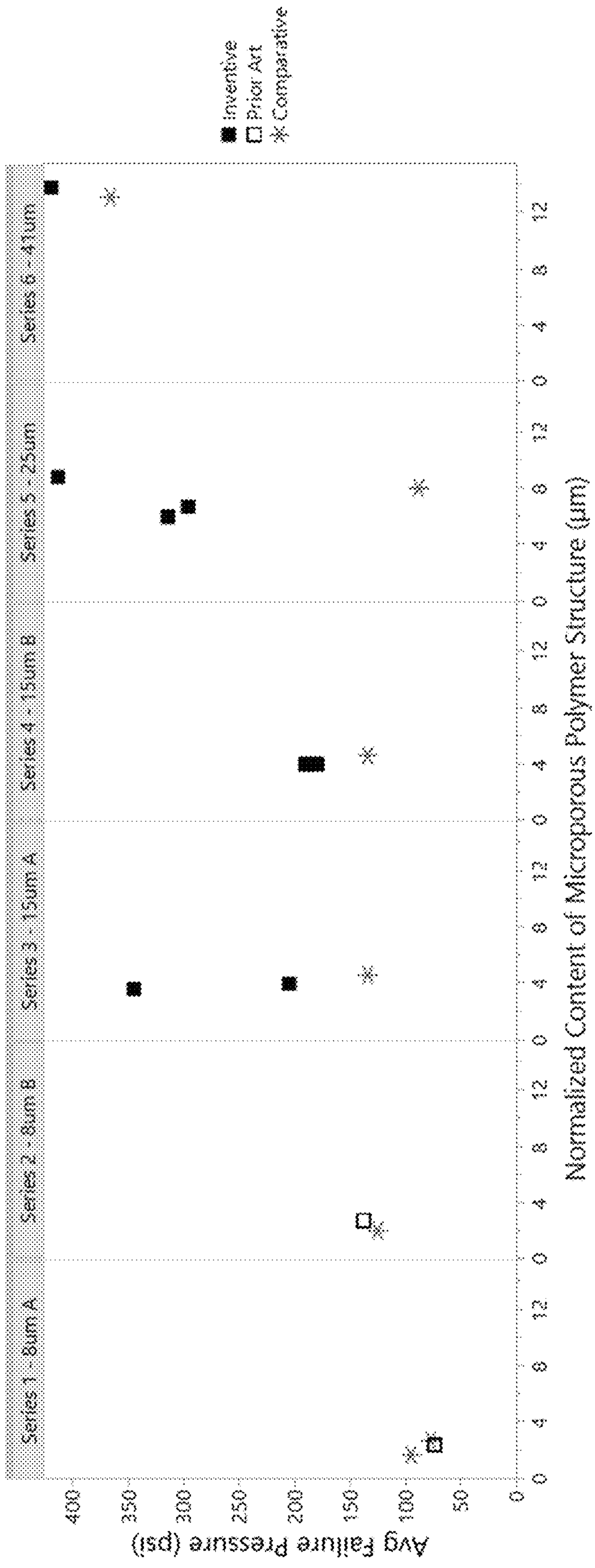
FIG. 10 shows a graph representing the average failure pressure (psi) of the composite membranes of the examples against the total ePTFE content of the composite membranes (mpa). The graph shows four series of data, each series having a comparable composite membrane thickness.

The properties of the composite membranes of the examples are presented in Table 1 (FIG. 11). The properties of the microporous polymer structures employed in the composite membranes are presented in Table 2 (FIG. 12). The improvement of the puncture resistance is illustrated in FIG. 10, which shows a graph comparing the average failure pressure of comparable composite membranes with the average failure pressure of inventive composite membranes, plotted against the normalized content of the microporous polymer structure in each composite membrane (μm). Referring to FIG. 10, each datapoint is associated with average failure pressure data (psi) against the normalized content of microporous polymer structure for each series of examples, discussed below in greater detail.

Discussion of Results

Series 1 (plotted as 8 μm A in FIG. 10) comprises a prior art example 1, that corresponds to Example 11.2 of WO2018/232254, which is incorporated herein in its entirety. Series 1 further comprises two comparative examples. The composite membranes have a similar thickness of about 8 μm at 0% RH. Prior art example 1 has two reinforcing layers comprising ePTFE as microporous polymer structure disposed in contact with each other, while comparative examples 1.1 and 1.2 have a single reinforcing ePTFE layer. The content of ePTFE (expressed as mass of ePTFE per area of the composite membrane) is comparable in prior art example 1 and comparative example 1.1 (as shown in Table 1, the total mass per area of ePTFE in the composite membrane is about 6 $g/m^2$). The normalized total content of microporous polymer structure as shown in Table 1, it is about 2.5 μm. Comparative example 1.2 has a lower content of ePTFE in a single reinforcing layer (3.9 $g/m^2$ or a normalized total ePTFE content of 1.7 μm). All three examples provide a poor average failure pressure well under 150 psi. These composite membranes are therefore susceptible to piercing by the components of an electrochemical device, such as a redox flow battery, upon device assembly.

Series 2 (plotted as 8 μm B in FIG. 10) comprises a prior art example 2 (which corresponds to example 7.3 of WO2018/232254) having two ePTFE reinforcing layers separated by an internal layer of unreinforced ion exchange material. This series also comprises comparative example 2.1 having a single ePTFE reinforcing layer. In this series, the composite membranes also have a thickness at 0% RH of about 8 μm. The total ePTFE content is greater in prior art example 2 (6.1 $g/m^2$ or a normalized total ePTFE content of 2.7 μm) than in comparative example 2.1 (4.5 $g/m^2$ or a normalized total ePTFE content of 2 μm). Both composite membranes present provide a poor average failure pressure under 150 psi. These composite membranes are therefore susceptible to piercing by the components of an electrochemical device, such as a redox flow battery, upon device assembly.

Series 3 (plotted as 15 μm A in FIG. 10) comprises one comparative example 3.1 having a single ePTFE reinforcing layer and two inventive examples having two ePTFE reinforcing layers. The membranes have a comparative thickness of about 15 μm at 0% RH. Although comparative example 3.1 has a greater total ePTFE content (10.4 $g/m^2$ or a normalized total ePTFE content of 4.6 μm) than inventive examples 3.2 (7.8 $g/m^2$ or a normalized total ePTFE content of 3.6 μm) and 3.3 (9 $g/m^2$ or a normalized total ePTFE content of 4 μm), the average failure pressure of comparative example 1 is unacceptable and below 150 psi, while both inventive examples have significantly improved average failure pressures above 150 psi.

Series 4 (plotted as 15 μm B in FIG. 10) comprises three inventive examples having two ePTFE reinforcing layers. In FIG. 10 this series has also been plotted against comparative example 4.1 (which is the same sample as comparative example 3.1), because all the composite membranes have a comparative thickness of about 15 μm at 0% RH. These three inventive samples were prepared in a similar manner and they had the same content of ePTFE (9 $g/m^2$ or a normalized total ePTFE content of 4 μm) distributed over two reinforcing layers. The three inventive examples as well as inventive example 3.2 from series 3, which also had the same total content of ePTFE (9 $g/m^2$), all had a comparable average failure pressures above 150 psi, unlike comparative example 3.1/4.1, which had an unacceptable average failure pressure below 150 psi, even though it had a greater total content of ePTFE (10.4 $g/m^2$). In this series it can be seen that the separation between the reinforcing layers does not result in a significant difference in the average failure pressure.

Series 5 (plotted as 25 μm in FIG. 10) had one comparative example 5.1 having a single reinforcing ePTFE layer having a total ePTFE content of 18 $g/m^2$ (normalized total ePTFE content of 8 μm), inventive examples 5.1 and 5.3 having two reinforcing ePTFE layers in direct contact and inventive example 5.2 having three reinforcing ePTFE layers in direct contact. All of these composite membranes had a comparable thickness of about 25 μm and a total content of ePTFE from about 13.5 $g/m^2$ to about 20 $g/m^2$ (normalized total ePTFE content from 6 to 8.8 μm). As shown in FIG. 10, these thicker membranes have improved average failure pressures compared to the inventive examples of series 3 and 4. Without wishing to be bound by theory, the improved average failure pressure may be due to an increased total content of ePTFE in the membrane. In addition, comparative example 5.2, which had three ePTFE layers had a significantly improved average failure pressure compared to examples 5.1 and 5.3, which had a comparable total content of ePTFE distributed over two reinforcing layers rather than three. All of the inventive examples in this series presented a superior average failure pressure compared with comparative example 5.1, which had a total content of ePTFE distributed in a single reinforcing layer (and having a comparable total content to Inventive Example 5.4).

Finally, series 6 (plotted as 41 μm in FIG. 10) had one comparative example 6.1 having a single reinforcing ePTFE layer having a total mass of ePTFE per area of composite membrane of about 29.5 $g/m^2$, and an inventive example 6.2 having three reinforcing ePTFE layers and having a total mass of ePTFE per area of composite membrane of about 31.2 $g/m^2$. The membranes have a comparative thickness of about 40 μm at 0% RH and similar density-normalized total ePTFE content of about 13 μm. Each sample showed average failure pressure well above 150 psi due to high thickness and ePTFE content. However, inventive sample 6.2 showed a marked improvement over comparative example 6.1 as none of the five samples of 6.2 tested failed when tested up to 419 psi, reported as the maximum observable average failure pressure of >419 psi.

Surprisingly, these data show that, for a given content of microporous polymer structure in a composite membrane, distributing the microporous polymer structure over at least two reinforcing layers results in a significantly improved average failure pressure compared with distributing the same content of microporous polymer structure in a single reinforcing layer. However, this observation only occurs in membranes of a minimum thickness of about 10 μm at 0% RH. As shown in series 1 and 2, composite membranes of about 8 μm at 0% RH had unacceptable average failure pressures, irrespective of the number of reinforcing layers. Furthermore, increasing the number of reinforcing layers comprising a microporous polymer structure (e.g. from one to two or two to three) for a comparable total content of microporous polymer structure significantly improves the average failure pressure, as shown in series 5 and series 6. Finally, for a similar composite membrane construction (in terms of the number of reinforcing layers comprising a microporous polymer structure), increasing the total content of microporous polymer structure in the composite membrane improves the average failure pressure. Composite membranes according to this disclosure therefore are highly desirable because they have superior resistance to piercing by elements of electrochemical devices upon device fabrication, without compromising the performance of the membranes.

While the invention has been described in detail, modifications within the spirit and scope of the invention will be readily apparent to the skilled artisan. It may be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

The invention claimed is:

1. A composite membrane for an electrochemical device, comprising:

a) at least two reinforcing layers, each of said at least two reinforcing layers comprising a microporous polymer structure; and b) an ion exchange material (IEM) at least partially imbibed within the microporous polymer structure of the at least two reinforcing layers and rendering the microporous polymer structure occlusive;

wherein the composite membrane has a thickness at 0% RH of at least 10 μm; and wherein the microporous polymer structure is present in a total content of at least 15 vol % based on the total volume of the composite membrane, wherein the normalized total content of microporous polymer structure within the composite membrane is at least 3.5 μm based on the total area of the composite membrane, wherein the normalized total content of the microporous polymer structure within the composite membrane is calculated with the following formula:

$$\left[\sum \frac{M_{mps1} \text{ in each reinforcing layer}/A_{composite\ membrane}(\text{g}\cdot\text{m}^{-2})}{\text{matrix skeletal density}_{mps1}(\text{g}\cdot\text{cm}^{-3})} + \right.$$

$$\sum \frac{M_{mps2} \text{ in each reinforcing layer}/A_{composite\ membrane}(\text{g}\cdot\text{m}^{-2})}{\text{matrix skeletal density}_{mps2}(\text{g}\cdot\text{cm}^{-3})} + \ldots +$$

-continued $$\sum \left[ \frac{M_{mpsN} \text{in each reinforcing layer}/A_{composite\ membrane}(g \cdot m^{-2})}{\text{matrix skeletal density}_{mpsN}(g \cdot cm^{-3})} \right] \cdot 10^{-6} \frac{m^3}{cm^3}$$

wherein mps1 is microporous polymer structure 1, mps2 is microporous polymer structure 2, mpsN is microporous polymer structure N (if there are N different types of microporous polymer structures within the composite membrane).

2. The composite membrane according to claim 1, wherein a composition of the at least two reinforcing layers is the same or wherein a composition of the at least two reinforcing layers is different.

3. A composite membrane according to claim 1, wherein the microporous polymer structure comprises at least one fluorinated polymer.

4. A composite membrane according to claim 3, wherein the composite membrane has a total content of microporous polymer structure of at least 8 $g \cdot m^{-2}$ based on the sum of the mass per area of all the reinforcing layers present in the composite membrane.

5. A composite membrane according to claim 1, wherein the microporous polymer structure comprises a hydrocarbon polymer.

6. A composite membrane according to claim 1, wherein one of:

the at least two reinforcing layers are in direct contact; or the composite membrane comprises at least one internal layer of ion exchange material between the at least two reinforcing layers.

7. A composite membrane according to claim 1, wherein the at least two reinforcing layers are separated by a distance d.

8. A composite membrane according to claim 7, wherein the distance d is from 0.1 μm to 20 μm at 0% RH.

9. A composite membrane according to claim 1, wherein one of:

the composite membrane comprises more than one layer of ion exchange material, wherein the layers of ion exchange material are formed of the same ion exchange material; or the ion exchange material comprises more than one layer of ion exchange material.

10. A composite membrane according to claim 1, wherein at least one of:

the microporous polymer structure is fully imbibed with the ion exchange material;

the microporous polymer structure of each of the at least two reinforcing layers has a first surface and a second surface, and wherein the ion exchange material forms a layer on at least one of the first surface or the second surface of each of the at least two reinforcing layers.

11. The composite membrane as in claim 1, wherein the microporous polymer structure of each of the at least two reinforcing layers has a first surface and a second surface, and wherein the microporous polymer structure is mostly imbibed with the ion exchange material, but comprises a region of un-imbibed or non-occlusive region of the microporous polymer structure closest to the first surface of at least one of the at least two reinforcing layers.

12. The composite membrane as in claim 11, wherein the microporous polymer structure of the at least two reinforcing layers is 90% occluded with the ion exchange material.

13. A composite membrane according to claim 1, wherein the average equivalent volume of the ion exchange material is from 240 cc/mole eq to 870 cc/mole eq.

14. A composite membrane according to claim 1, wherein the ion exchange material comprises at least one ionomer, or wherein the ion exchange material comprises at least one ionomer and wherein the at least one ionomer comprises a proton conducting polymer.

15. A composite membrane according to claim 1, wherein the composite membrane has a thickness at 0% RH of from 10 μm to 115 μm.

16. A composite membrane according to claim 1, wherein the composite membrane has an average failure pressure from 150 psi to 500 psi.

17. A composite membrane according to claim 1, further comprising at least one backer layer removably attached to one or more external surfaces of the composite membrane.

18. A membrane electrode assembly for an electrochemical device, comprising:

at least one electrode; and the composite membrane according to claim 1 in contact with the at least one electrode.

19. A membrane electrode assembly according to claim 18, wherein at least one of:

the composite membrane is attached to the at least one electrode;

the at least one electrode comprises a porous layer;

the at least one electrode comprises carbon fibers.

20. A membrane electrode assembly according to claim 18, wherein the membrane electrode assembly is a redox flow battery membrane-electrode assembly comprising:

a first electrode with a first surface and a second surface;

a second electrode with a first surface and a second surface; and a composite membrane with a first surface and a second surface according to claim 1, wherein the second surface of the first electrode is in contact with the first surface of the composite membrane and the first surface of the second electrode is in contact with the second surface of the composite membrane.

21. The membrane electrode assembly according to claim 20, wherein the first electrode layer and/or the second electrode layer is a porous layer having a pore size from 1 to 200 μm.

22. A membrane electrode assembly according to claim 20, wherein the first and/or second electrode is a carbon/platinum electrode with ionomer or wherein the electrode comprises an alloy with ionomer.

23. A membrane electrode assembly according to claim 18, wherein the at least one electrode is selected from a felt, a paper or a woven material.

24. A membrane electrode assembly according to claim 18, wherein the membrane electrode assembly is a fuel cell membrane electrode assembly comprising:

a composite membrane as described according to claim 1, wherein the composite membrane has a first surface and a second surface;

a first layer of electrode catalyst adhered to the first surface of the composite membrane; and a second layer of electrode catalyst adhered to the second surface of the composite membrane.

25. A membrane electrode assembly according to claim 24, wherein the first and second layers of electrode catalyst are nanoporous layers having a pore size of up to 100 nm.

26. A membrane electrode assembly according to claim 24, wherein a layer of platinum or ruthenium catalyst is adhered to the composite membrane.

27. A membrane electrode assembly according to claim 18, wherein the membrane electrode assembly is an electrolyzer electrode assembly comprising:

the composite membrane of claim 1, wherein the composite membrane has a first surface and a second surface, a first layer of electrode catalyst adhered to the first surface of the composite membrane; and a second layer of electrode catalyst adhered to the second surface of the composite membrane.

28. A fuel cell comprising the composite membrane according to claim 1.

29. A redox flow battery comprising the composite membrane according to claim 1.

30. An electrolyzer comprising the composite membrane according to claim 1.

* * * * *